United States Patent
Watanabe et al.

(10) Patent No.: US 9,102,357 B2
(45) Date of Patent: Aug. 11, 2015

(54) SIDE OUTER PANEL FOR VEHICLE

(75) Inventors: Yasunori Watanabe, Wako (JP);
Kenichi Kitayama, Wako (JP);
Shigeyuki Nagai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/127,334

(22) PCT Filed: Apr. 25, 2012

(86) PCT No.: PCT/JP2012/061035
§ 371 (c)(1),
(2), (4) Date: Feb. 20, 2014

(87) PCT Pub. No.: WO2013/008515
PCT Pub. Date: Jan. 17, 2013

(65) Prior Publication Data
US 2014/0152053 A1    Jun. 5, 2014

(30) Foreign Application Priority Data

Jul. 12, 2011 (JP) ............... P2011-154044
Jul. 12, 2011 (JP) ............... P2011-154081

(51) Int. Cl.
*B62D 25/02* (2006.01)
*B62D 25/04* (2006.01)
*B62D 27/00* (2006.01)
*B62D 25/20* (2006.01)

(52) U.S. Cl.
CPC ............. *B62D 25/04* (2013.01); *B62D 25/02* (2013.01); *B62D 25/025* (2013.01); *B62D 25/2036* (2013.01); *B62D 27/00* (2013.01)

(58) Field of Classification Search
CPC ...... B62D 25/02; B62D 25/025; B62D 25/04; B62D 25/2036; B62D 27/00; B62D 27/02; B62D 27/023; B62D 29/007
USPC ............. 296/181.1, 193.01, 193.05, 193.06, 296/203.01, 203.03
See application file for complete search history.

(56) References Cited

U.S. PATENT DOCUMENTS

| 7,011,361 B2 * | 3/2006 | Reed et al. ............... 296/203.03 |
| 7,914,068 B2 | 3/2011 | Mizohata |
| 2005/0161965 A1 * | 7/2005 | Eberlein ..................... 296/29 |

FOREIGN PATENT DOCUMENTS

| GB | 2434562 A * | 8/2007 |
| JP | S48-81224 A | 10/1973 |
| JP | S57-159871 U | 10/1982 |
| JP | S59-151778 U | 10/1984 |
| JP | 2000-071900 A | 3/2000 |
| JP | 2000-313353 A | 11/2000 |
| JP | 2010-260536 A | 11/2010 |

* cited by examiner

*Primary Examiner* — Jason S Daniels
(74) *Attorney, Agent, or Firm* — Carrier Blackman & Associates, P.C.; William D. Blackman; Joseph P. Carrier

(57) ABSTRACT

A first outer panel has: a first general surface; and a first flange section having an end section of the first general surface recessed more than the first general surface. A second outer panel has: a second general surface having a surface flush with the first general surface; and a second flange section that is recessed from the second general surface and is joined overlapping with the first flange section. A joint that is recessed more than the first and second general surface is formed in the joined section. A filler substance is provided in the joint, and the section from the first general surface to the second general surface is formed in a continuous surface.

9 Claims, 20 Drawing Sheets

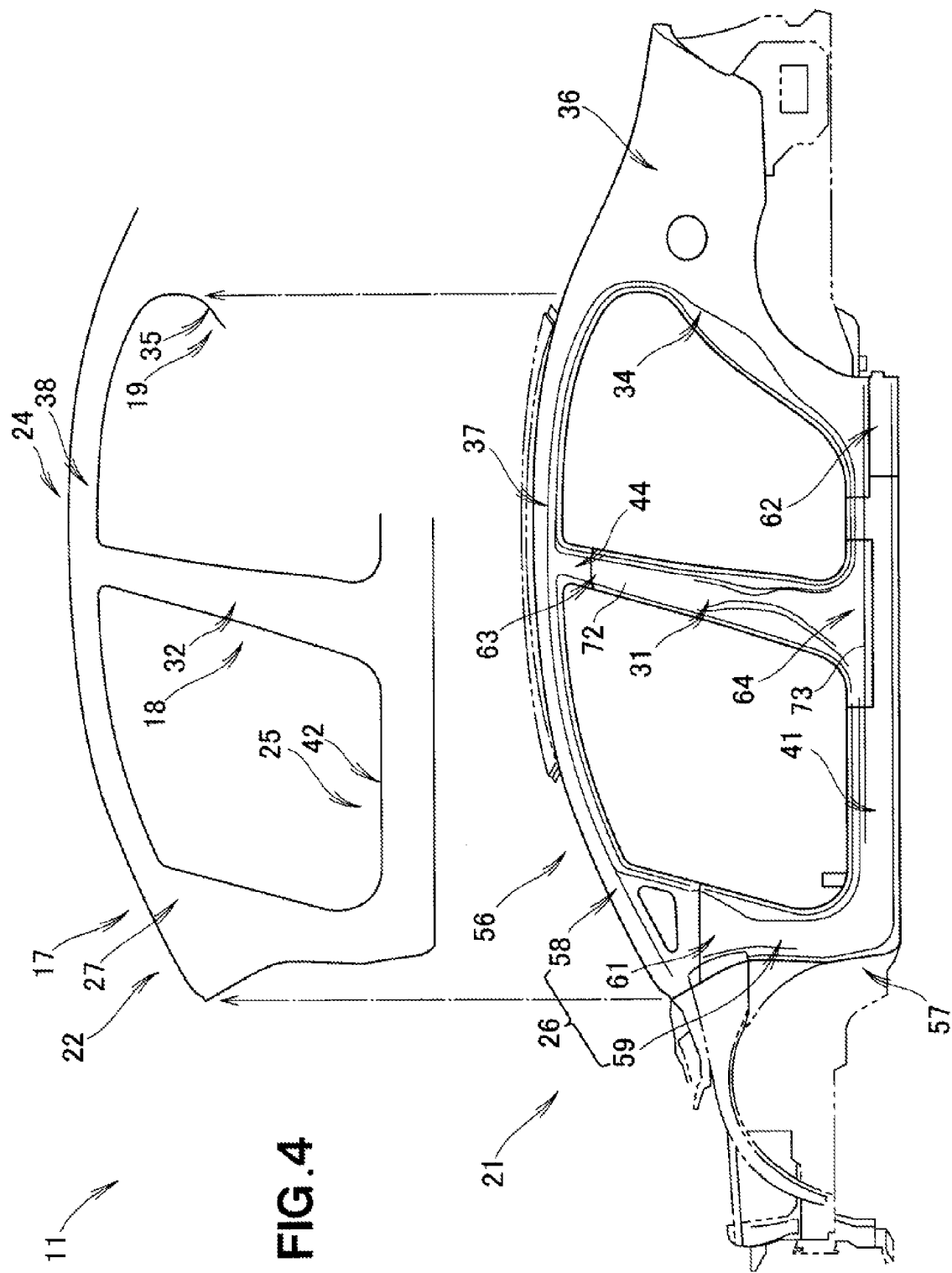

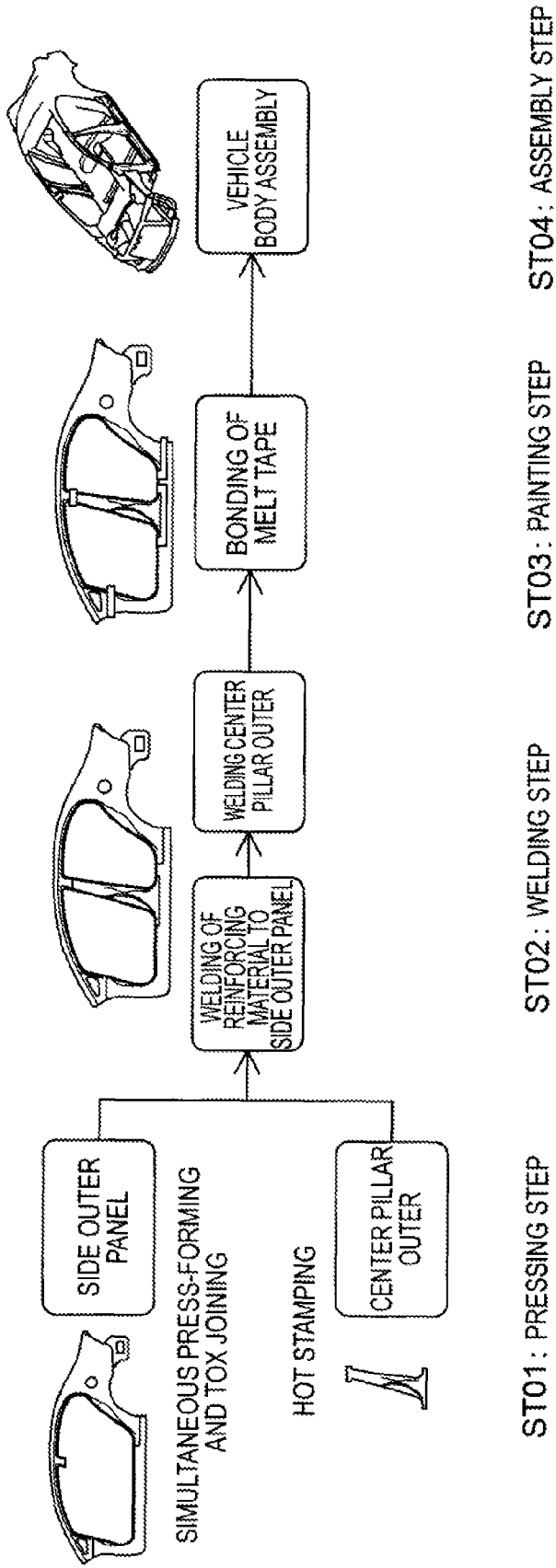

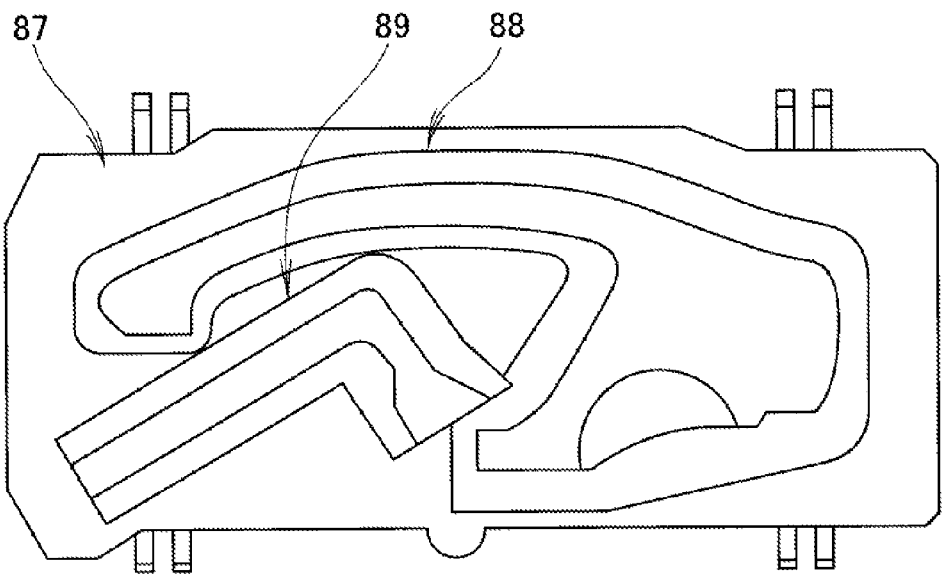
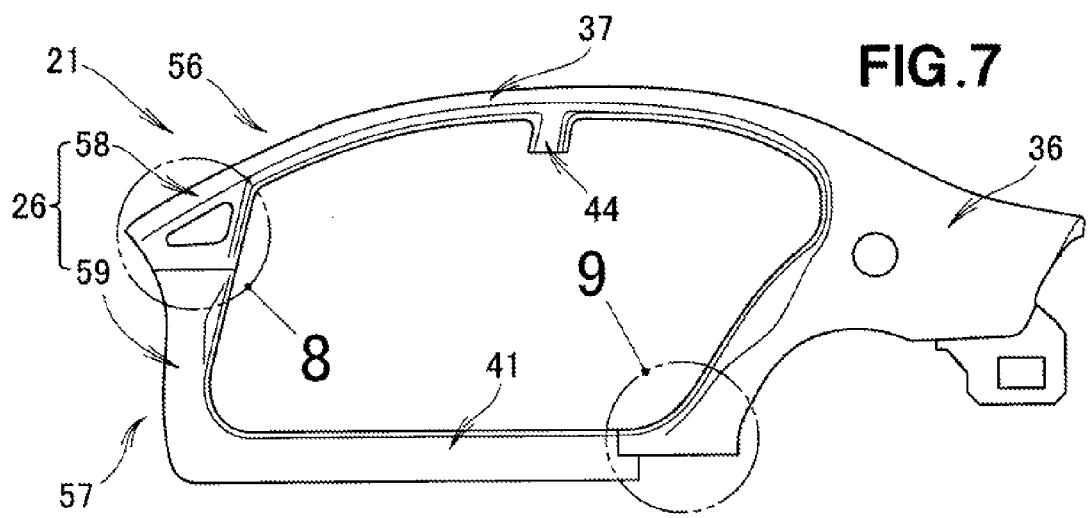
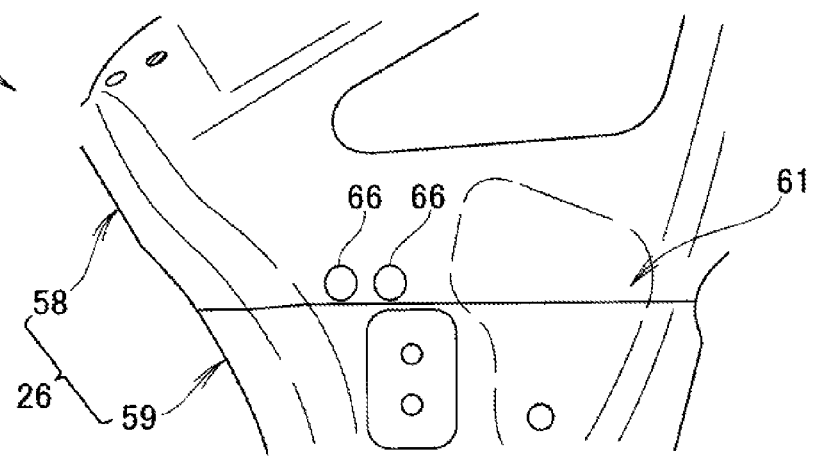

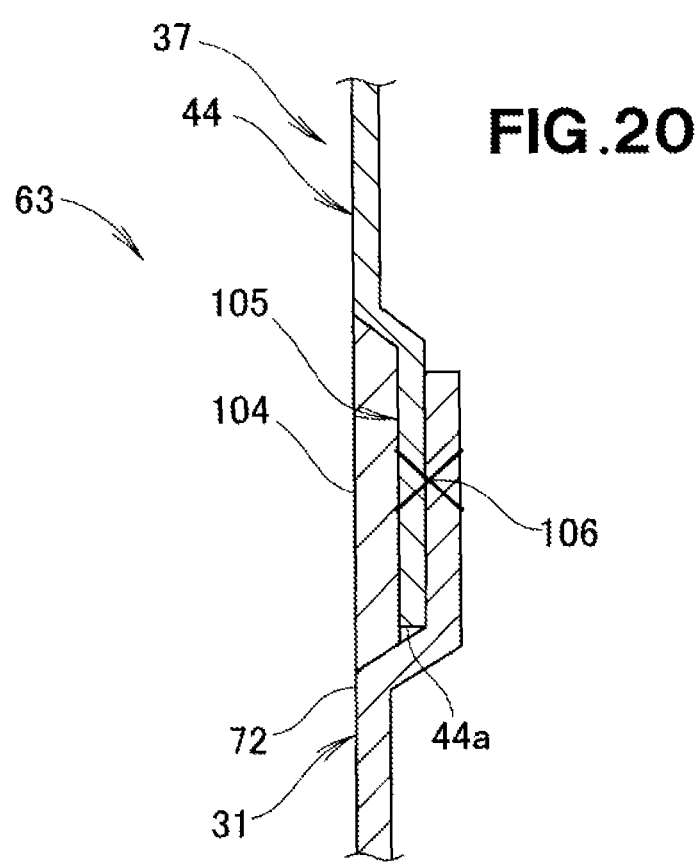

SIDE OUTER PANEL FOR VEHICLE

TECHNICAL FIELD

The present invention relates to a side outer panel for a vehicle, assembled by joining two separate panels.

BACKGROUND ART

In a side outer panel for a vehicle, door openings of the vehicle are formed of an outer panel part shaped into a frame assembled with a low-strength member and a high-strength member, and a center pillar part having both ends joined with opposed upper and lower sections of the outer panel part. The center pillar part is formed of a high-strength member, one end of which is joined to the panel lower section from the outside of a side surface of the passenger compartment, and the other end of which is joined to the panel upper section from the inside of the side surface of the passenger compartment.

In the side outer panel described above, the center pillar part, which is constituted as a separate part, can be welded or otherwise joined; therefore, high-strength materials or thick sheet materials can be used for the center pillar part, allowing the center pillar part to have the desired level of strength (see, e.g., Patent Document 1).

PRIOR ART LITERATURE

Patent Literature

[Patent Literature 1] Japanese Patent Application Laid-Open Publication (JP-A) 2010-260536

SUMMARY OF INVENTION

Technical Problem

In the side outer panel for a vehicle disclosed in Patent Document 1, the center pillar part is joined at its other end to the panel upper section from the inside of the side surface of the passenger compartment. It is necessary to design the joint (seam) at which the other end of the center pillar part and the panel upper section are joined, so as to be inconspicuous. To this end, a dust sealer (sealant) also functioning to prevent corrosion of the edge of the other end of the center pillar is applied onto the joint, and protruding parts of the dust sealer are removed with a spatula to smooth out the material.

However, when the dust sealer is smoothed out, the dust sealer at the edge of the other end of the center pillar becomes thinner, and can corrode. In addition, the finished appearance is not especially satisfactory. In some instances, when joining two panels, a hot melt in the form of a fixed-width tape (molten tape) is bonded to a joined section formed by the two panels so as to cover the joined section. In this case, applying the melt tape to the joined section solely for bonding purposes merely yields a finish reflecting the inherent surface state of the melt tape, while the degree of adhesion to the rear surface side of the panel is low. The material is therefore unsuitable for use on visible exterior surfaces.

It is accordingly an object of the present invention to provide an outer side panel for a vehicle, allowing the corrosion resistance of panel seams to be improved, a smooth seam-concealing surface to be formed, and the design to be optimized.

Solution to Problem

According to a first aspect of the present invention, there is provided a side outer panel for a vehicle, having a first outer panel and a second outer panel joined together at a joint and provided with a filler in the joint, wherein the side outer panel for a vehicle is characterized in that: the first outer panel has a first general surface constituting a panel surface, and a first flange section formed by an edge section of the first general surface that is depressed relative to the first general surface; the second outer panel has a second general surface constituting a panel surface situated at the same level as the first general surface in a neighboring section when joined, and a second flange section depressed relative to the second general surface and overlappingly joined to the first flange section; the second flange section being joined to the first flange section to form a seam that is depressed relative to the first and second general surfaces, the seam being filled with the filler up to a surface height of the first and second general surfaces, and the first general surface and the second general surface being formed into a continuous surface.

According to a second aspect of the present invention, it is preferable that the filler is a hot melt in the form of a fixed-width tape.

According to a third aspect of the present invention, in preferred practice, the filler is a dust sealer.

According to a fourth aspect of the present invention, it is preferable that the first flange section has a first sloping surface bent at an obtuse angle from the first general surface, and a first flat section extending parallel to the first general surface from the first sloping surface; the second flange section has a second sloping surface bent at an obtuse angle from the second general surface, and a second flat section extending parallel to the second general surface from the second sloping surface; and the hot melt in the form of a fixed-width tape has a width extending from a medial section of the first sloping surface to a medial section of the second sloping surface.

According to a fifth aspect of the present invention, in preferred practice, the seam is provided at a center pillar outer.

According to a sixth aspect of the present invention, it is preferable that the seam is formed in a section exposed from an exterior component when the first and second outer panels are covered by the exterior component.

According to a seventh aspect of the present invention, in preferred practice, the joint is coated with the dust sealer in a section thereof covered by an exterior component when the first and second outer panels are covered by the exterior component.

According to an eighth aspect of the present invention, it is preferable that the side outer panel is separated into an upper frame and a lower frame, the upper frame being integrally formed of an ordinary steel plate and including a front pillar outer upper section, a roof side outer, a rear pillar outer, and a rear fender that are each constituted by the first outer panel, and the lower frame being integrally formed of a steel plate of higher tensile strength than the upper frame, and including a front pillar outer lower section and a side sill outer that are each constituted by the second outer panel; in the joint of the front pillar outer upper section and the front pillar outer lower section, a region covered by a front fender as the exterior component being clinch-joined, and in the joint of the side sill outer and the rear pillar outer, a region covered by a side sill garnish as the exterior component being clinch-joined.

According to a ninth aspect of the present invention, in preferred practice, a region of the joint which is not concealed by the exterior component is formed in a seam depressed relative to the general surfaces constituting the panel surface, the seam being provided with a filler.

According to a tenth aspect of the present invention, it is preferable that the front pillar outer upper section and the front pillar outer lower section are formed into a U-shaped cross section, and bottom surfaces of the U-shaped cross section are clinch-joined to one another.

According to an eleventh aspect of the present invention, in preferred practice, a hot-stamped center pillar outer is spot-welded between the roof side outer and the side sill outer.

According to a twelfth aspect of the present invention, it is preferable that the joint is coated with a dust sealer in a region thereof covered by the exterior component.

Advantageous Effects of Invention

According to the first aspect of the invention, the outer panel of the vehicle has a joint at which the first outer panel and the second outer panel are joined together, the joint being filled with a filler. The first outer panel is formed of a first general surface constituting a panel surface, and a first flange section formed by an edge section of the first general surface that is depressed relative to the first general surface. The second outer panel is formed of a second general surface constituting a panel surface situated at the same level as the first general surface in a neighboring section when joined, and a second flange section depressed relative to the second general surface and overlappingly joined to the first flange section. Joining the second flange section to the first flange section forms a seam that is depressed relative to the first and second general surfaces. This seam is filled with a filler up to a surface height of the first and second general surfaces, forming a continuous surface from the first general surface to the second general surface. This arrangement prevents corrosion in the seam depressed relative to the first and second general surfaces, and forms a smooth surface from which the seam cannot be seen. As a result, corrosion resistance in the seam of the panels can be improved, as can the design of the side outer panel for a vehicle. For example, because the filler can also be painted the same color, the design can be improved further.

According to the second aspect of the invention, using a hot melt in the form of a fixed-width tape (melt tape) for the filler facilitates the step of sealing the outer panel of the vehicle.

According to the third aspect of the invention, having a dust sealer (sealing agent) used as the filler allows the dust sealer to be applied with a coating gun held by a robot, allowing the coating operation to be automated.

According to the fourth aspect of the invention, the first flange section includes a first sloping surface bent at an obtuse angle from the first general surface, and a first flat section extending parallel to the first general surface from this first sloping surface; and the second flange section includes a second sloping surface bent at an obtuse angle from the second general surface, and a second flat section extending parallel to the second general surface from this second sloping surface. The width of the hot melt in the form of a fixed-width tape extends from a medial section of the first sloping surface to a medial section of the second sloping surface. Therefore, e.g., by being melted, the hot melt will flow into upper sections of the sloped surfaces and smooth out. This further facilitates sealing the side outer panel of the vehicle.

According to the fifth aspect of the invention, seams are provided at the center pillar outer. For example, when joining to a roof side outer including an outer panel and to a side sill outer including an outer panel, it is desirable to reliably inhibit corrosion in the seams, while also making the seams less conspicuous. Incorporating the seams into the center pillar outer makes it possible to improve the quality of the outer panels of the vehicle, as well as the design. Moreover, having smooth seams allows the sealing performance of the door seals to be improved.

According to the sixth aspect of the invention, when the exterior component extends over the first and second outer panels, the seam will be formed in a section exposed from an exterior component, minimizing the coverage area smoothed by the filler. This facilitates fabrication of the outer panels of the vehicle, which in turn reduces the cost of the outer panels of the vehicle.

According to the seventh aspect of the invention, when the exterior component covers the first and second outer panels, the dust sealer is applied on a section of the joint covered by an exterior component, minimizing the coverage area smoothed by the filler. This reduces the cost of the outer panels of the vehicle.

According to the eighth aspect of the invention, the side outer panel of the vehicle, which is configured as a frame forming the door opening, is separated into an upper frame integrally formed of an ordinary steel plate and including an upper section of the front pillar, the roof side outer, the rear pillar outer, and the rear fender; and a lower frame integrally formed of a steel plate of higher tensile strength than the upper frame, and including the front pillar outer lower section and the side sill outer. In the joint between the front pillar outer upper section and the front pillar outer lower section, a region covered by an exterior component, specifically, a front fender, is clinch-joined; and in the joint between the side sill outer and the rear pillar outer, a region covered by an exterior component, specifically, a side sill garnish, is clinch-joined. Specifically, because the upper frame and the lower frame are provisionally held through clinch joints, the upper frame and the lower frame can be transported from the pressing step to the welding step as a single unit. As a result, the side outer panel can be produced more efficiently. For example, clinch joints having relatively large indentations can be concealed by exterior components, which will enhance the design of the side outer panel.

According to the ninth aspect of the invention, a region of the joint which is not concealed by the exterior component forms a seam depressed relative to the general surfaces constituting the panel surface, and the seam is filled with a filler. Therefore, joint strength can be ensured, e.g., through spot-welding of the seam, and the seam can then be filled with a filler to enhance the design.

According to the tenth aspect of the invention, the front pillar outer upper section and the front pillar outer lower section are formed so as to have U-shaped cross sections, the bottom surfaces of which being clinch-joined together. Since stress is readily dispersed in the bottom surfaces, the provisional hold afforded by the clinch joint is stable. A provisional hold can thereby be accomplished using few clinch joints (join sites).

According to the eleventh aspect of the invention, a hot-stamped center pillar outer is spot-welded between the roof side outer and the side sill outer; therefore, the side outer panel can be made stronger.

According to the twelfth aspect of the invention, a dust sealer is used to coat the joint in a region covered by an exterior component. Therefore, for example, the coverage area smoothed by the filler which fills the seam can be minimized. The outer panels of the vehicle can thereby be fabricated more easily, which in turn reduces the cost of the outer panels of the vehicle.

BRIEF DESCRIPTION OF DRAWINGS

FIG. 4 is a side view of the side outer panel shown in FIG. 1;

FIG. 5 is a diagrammatical view showing a method of manufacturing the side outer panel shown in FIG. 4;

FIG. 6 is a diagrammatical view showing a step of pressing the side outer panel of FIG. 5;

FIG. 7 is a view showing a clinch joint between an upper frame and a lower frame of the side outer panel shown in FIG. 4;

FIG. 8 is an enlarged view of a region 8 shown in FIG. 7;

FIG. 20 is an enlarged sectional view taken along line 20-20 of FIG. 19;

DESCRIPTION OF EMBODIMENT

Figure 1:
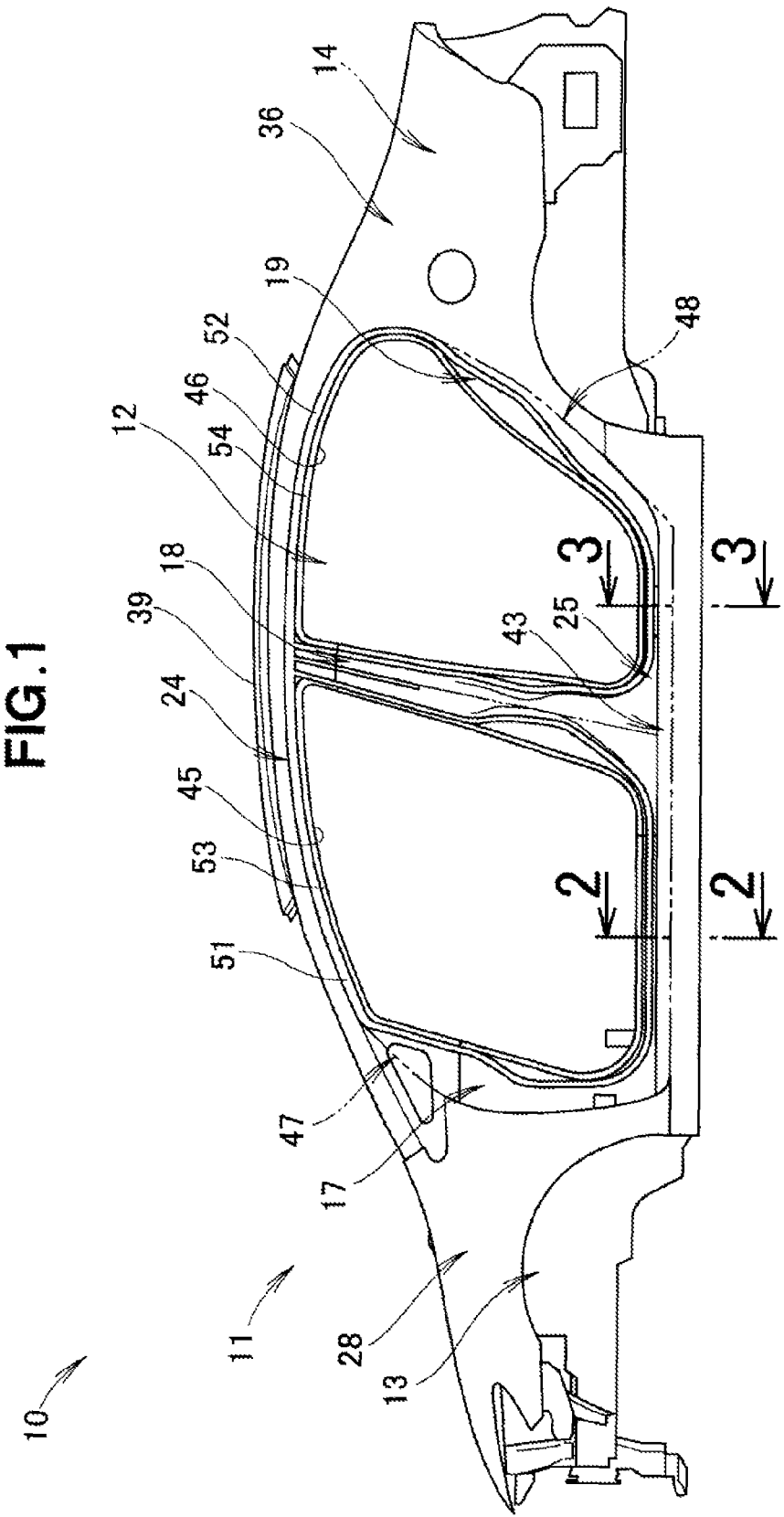
FIG. 1 is a side view of a vehicle body incorporating a side outer panel according to an embodiment of the present invention.
Figure 2:
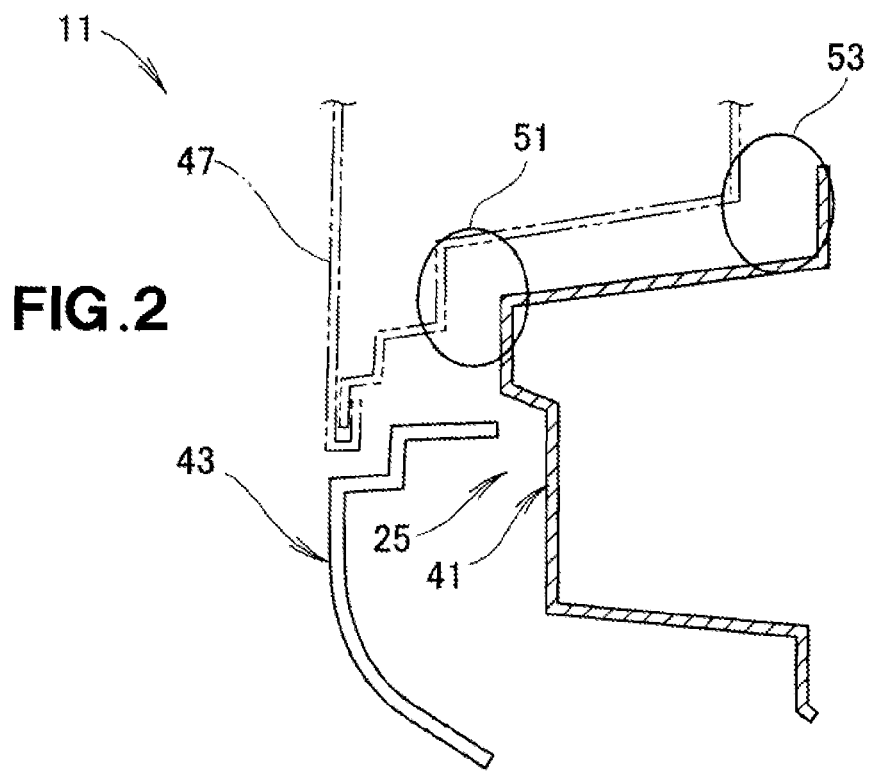
FIG. 2 is an enlarged sectional view taken along line 2-2 of FIG. 1.
Figure 3:
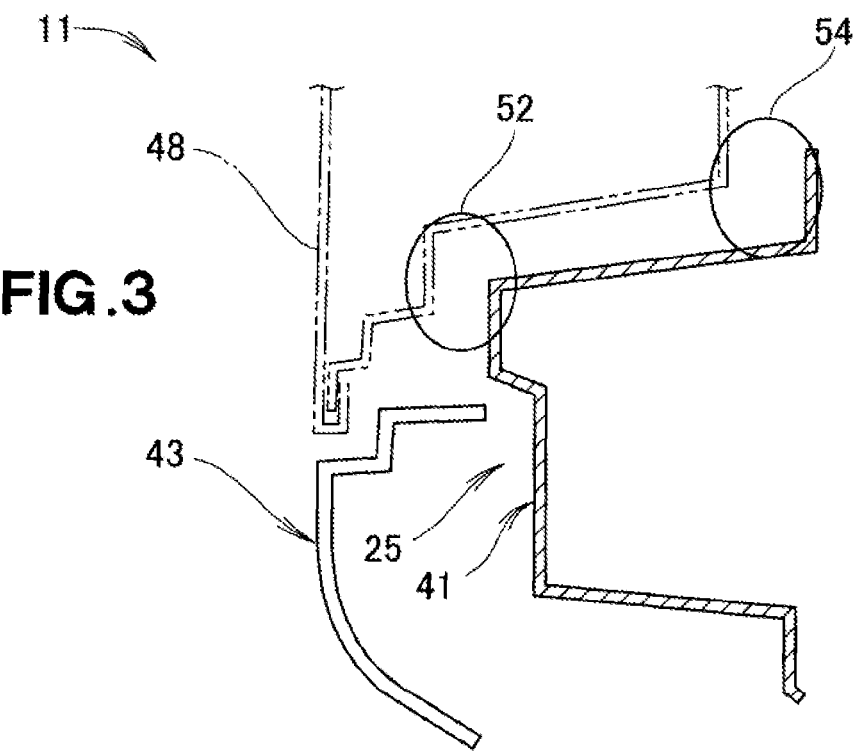
FIG. 3 is an enlarged sectional view taken along line 3-3 of FIG. 1.

A certain preferred embodiment of the present invention will be described below with reference to the accompanying drawings.

Embodiment

As shown in FIGS. 1 to 4, a vehicle 10 include a vehicle body 11 having a side part which is provided with a front pillar 17 serving as a vertical structural element at a front side of a passenger compartment 12; a center pillar 18 serving as a vertical structural element at a center side of the passenger compartment 12; a rear pillar 19 serving as a vertical structural element at a rear side of the passenger compartment 12; a roof side rail 24 connecting an upper end of the front pillar 17, an upper end of the center pillar 18, and an upper end of the rear pillar 19 and serving as a longitudinal structural element at an upper side of the passenger compartment 12; and a side sill 25 connecting a lower end of the front pillar 17, a lower end of the center pillar 18, and a lower end of the rear pillar 19 and serving as a longitudinal structural element at a lower side of the passenger compartment 12.

The front pillar 17 includes a front pillar outer 26 and front pillar inner 27. The front pillar 17 is provided with a front fender (exterior component) 28 forming a side part of an engine compartment 13 at the front of the vehicle body, and is partially covered by this front fender 28.

The center pillar 18 includes a center pillar outer 31 and a center pillar inner 32. The rear pillar 19 includes a rear pillar outer 34 and a rear pillar inner 35. The rear pillar 19 is provided with a rear fender 36 forming a side part of a trunk compartment 14 at the rear of the vehicle body.

The roof side rail 24 includes a roof side outer 37 and roof side inner 38. The roof side rail 24 is provided with a roof 39 forming an upper section of the passenger compartment 12 extending in a laterally inward direction of the vehicle body. The roof side outer 37 includes an extension 44 to which an upper end 72 of the center pillar outer 31 is joined.

The side sill 25 includes a side sill outer 41 and a side sill inner 42. The side sill 25 is a structural member for protecting a lower end side of the vehicle body from the outside in the lateral direction, and is covered by a side sill garnish (exterior component) 43 that functions as a design element.

The side part of the vehicle body 11 includes a side inner panel 22 constituted by the front pillar inner 27, the center pillar inner 32, the rear pillar inner 35, the roof side inner 38, and the side sill inner 42; and a side outer panel 21 constituted by the front pillar outer 26, the center pillar outer 31, the rear pillar outer 34, the roof side outer 37, the side sill outer 41, and the rear fender 36.

The side outer panel 21 is joined to the side inner panel 22 so as to define a closed cross section in cooperation therewith. The side outer panel 21 is one type of outer panel for the vehicle.

The front pillar outer 26, the center pillar outer 31, a front part of the roof side outer 37, and a front part of the side sill outer 41 together form a front door opening 45. The front door opening 45 is covered by a front door 47.

The front door opening 45 is provided with a front door trim 53 for sealing the front door opening 45. The front door 47 is provided with a front door seal 51 for sealing the front door opening 45. The front door seal 51 is a primary sealing member for sealing the front door opening 45, while the front door trim 53 is a secondary sealing member for sealing the front door opening 45. Alternatively, the front door seal 51 may serve as the secondary sealing member, and the front door trim 53 as the primary sealing member.

A rear door opening 46 is formed by the center pillar outer 31, the rear pillar outer 34, a rear part of the roof side outer 37, and a rear part of the side sill outer 41. The rear door opening 46 is covered by a rear door 48.

The rear door opening 46 is provided with a rear door trim 54 for sealing the rear door opening 46. The rear door 48 is provided with a rear door seal 52 for sealing the rear door opening 46. The rear door seal 52 is a primary sealing member for sealing the sealing the rear door opening 46, while the rear door trim 54 is a secondary sealing member for sealing the sealing the rear door opening 46. Alternatively, the rear door seal 52 may serve as the secondary sealing member, and the rear door trim 54 as the primary sealing member.

The side outer panel 21 is constituted by an upper frame 56 integrally forming an upper section of the side outer panel 21; a lower frame 57 joined to the upper frame 56 and integrally forming a lower section of the side outer panel 21; and the center pillar outer 31 having an upper end 72 joined to the upper frame 56 and a lower end 73 joined to the lower frame 57.

The upper frame 56 includes a front pillar outer upper section 58, the roof side outer 37, the rear pillar outer 34, and the rear fender 36. The upper frame 56 is integrally formed of an ordinary steel plate (270 MPa grade steel plate). The lower frame 57 is integrally formed by a front pillar outer lower section 59 and the side sill outer 41. The lower frame 57 is integrally formed of a high-strength steel plate (980 MPa grade steel plate). The center pillar outer 31 is integrally formed of a ultrahigh-strength steel plate (1500 MPa grade steel plate).

Figure 12:
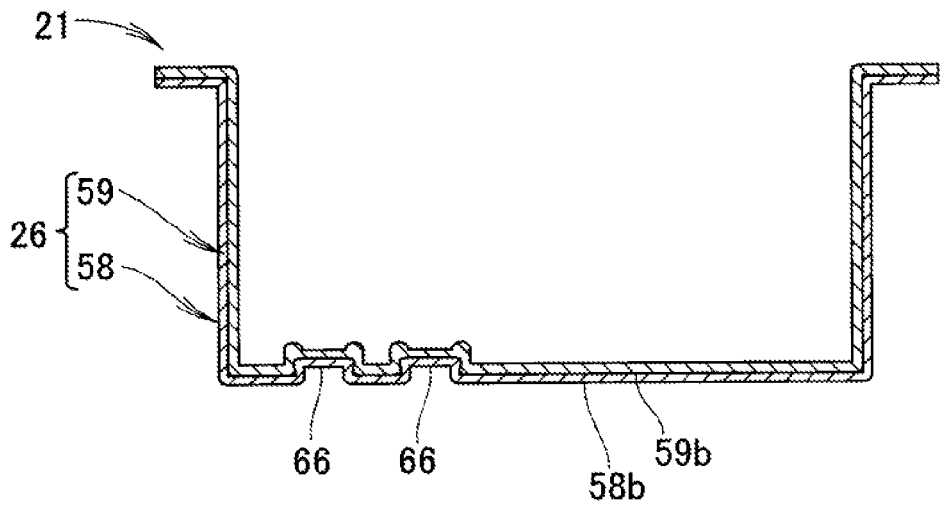
FIG. 12 is an enlarged sectional view taken along line 12-12 of FIG. 11.

During the manufacturing process, the front pillar outer 26 is separated into the front pillar outer upper section 58 and the front pillar outer lower section 59. As shown in FIG. 12, a bottom surface 58b of the front pillar outer upper section 58 and a bottom surface 59b of the front pillar outer lower section 59 are clinch-joined to be temporarily joined for transport. Specifically, upper clinch joints 66, 66 are provided at the bottom surfaces 58b, 59b of the front pillar outer upper section 58 and front pillar outer lower section 59.

The ordinary steel plate refers to a cold-rolled steel plate having a tensile strength of 270 MPa or above. The high strength steel plate is also called a high-tensile steel plate. The high strength steel plate refers to a cold-rolled steel plate having a tensile strength of 590 MPa or above. The ultrahigh strength steel plate refers to a cold-rolled steel plate having a tensile strength of 590 to 1180 MPa, and is also called hot-stamped material. Herein, hot stamp shaping (hot stamping) is a process in which steel plate is heated to high temperature so as to be readily deformable, and then shaped in a die while being quenched so that the steel plate will be stronger than before shaping. Specifically, the tensile strength of a hot-stamped material can be increased to about 1500 MPa by high-temperature heating followed by rapid cooling.

Specifically, the frame-shaped side outer panel 21 forming the door openings 45, 46 is constituted by the upper frame 56 (which includes the front pillar outer upper section 58, the roof side outer 37, the rear pillar outer 34, and the rear fender 36 that are integrally formed of an ordinary steel plate) and the lower frame 57 (which includes the front pillar outer lower section 59 and the side sill outer 41 that are integrally formed of a steel plate of higher tensile strength than the upper frame 56.)

As will be discussed below, in the side outer panel 21, the front pillar outer upper section 58 and the front pillar outer lower section 59 are joined together at a front pillar joint (joint) 61, and that part or region of the joint 61 which is covered by the front fender 28 used as an exterior component is clinch-joined. Similarly, the side sill outer 41 and the rear pillar outer 34 are joined together at a side sill joint (joint) 62, and that part or region of the joint 62 which is covered by the side sill garnish 43 used as an exterior component is clinch-joined.

The steps for manufacturing the vehicle body 11 will be described with reference to FIG. 5. ST indicates the step number (see FIGS. 1 to 4 for the reference signs used in the description in FIG. 5). The steps for manufacturing the vehicle body 11 include a pressing step, a welding step, a painting step, and an assembly step.

ST01: In the pressing step, the upper frame 56, the lower frame 57, and the center pillar outer 31 are press-worked. As shown in FIG. 6, the upper frame 56 and the lower frame 57 are simultaneously press-formed from respective blanks 88, 89 in a single die 87. Specifically, the upper frame 56 is formed of an ordinary steel plate (270 MPa grade steel plate; plate thickness t: 0.65), while the lower frame 57 is formed of a high strength steel plate (980 MPa grade steel plate; plate thickness t: 1.2), the materials of different tensile strengths and different plate thicknesses being press-formed simultaneously in a single die.

As shown in FIG. 5, the center pillar outer 31 is hot-stamped from a cold-rolled steel plate (hot-stamped material) having a tensile strength of 590 to 1180 MPa. Specifically, hot-stamping causes the strength of the center pillar outer 31 to be equivalent to a tensile strength of about 1500 MPa.

Figure 9:
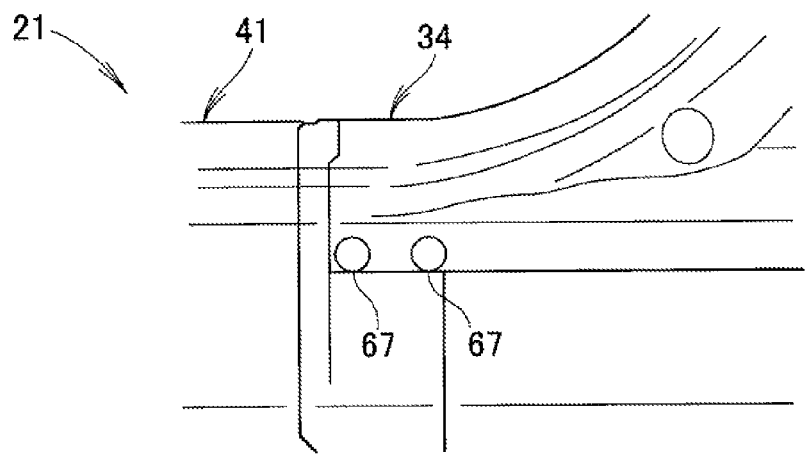
FIG. 9 is an enlarged view of a region 9 shown in FIG. 7.

As shown in FIGS. 7 to 9, the front pillar outer upper section 58 of the upper frame 56 and the front pillar outer lower section 59 of the lower frame 57 are clinch-joined at two locations, while the rear pillar outer 34 of the upper frame 56 and the side sill outer 41 of the lower frame 57 are clinch-joined at two locations. The upper frame 56 and the lower frame 57 are thus temporarily joined together and they are transported in this state from the pressing step to the welding step.

The sections in which the front pillar outer upper section 58 of the upper frame 56 and the front pillar outer lower section 59 of the lower frame 57 are clinch-joined at two locations are called upper clinch joints 66, 66, while the sections in which the rear pillar outer 34 of the upper frame 56 and side sill outer 41 of the lower frame 57 are clinch-joined at two locations are called lower clinch joints 67, 67.

Figure 10:
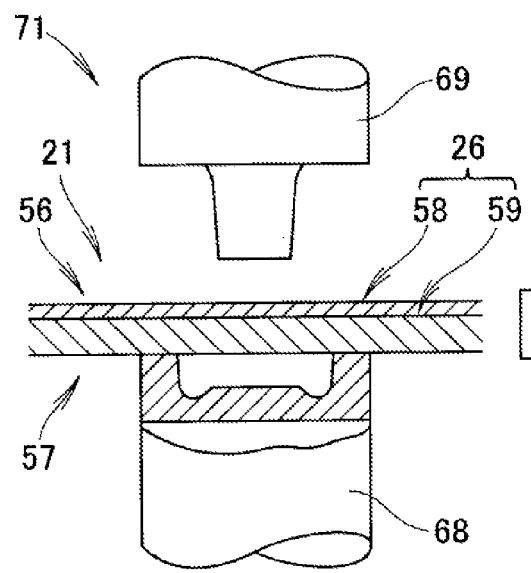
FIGS. 10(a) and 10(b) are views exemplifying a method of clinch-joining the side outer panel.
Figure 10:
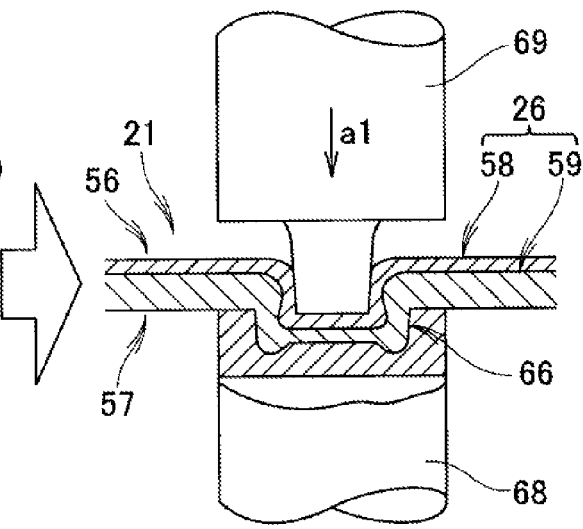

As shown in FIG. 10 (a), clinch-joining (formation of the upper and lower clinch joints 66, 67) is carried out in the pressing step by positioning a tool 71 composed of a die 68 and a punch 69 within the pressing step, and positioning a site for temporarily joining the upper frame 56 and the lower frame 57 between the die 68 and the punch 69.

As shown in FIG. 10 (b), the punch 69 is lowered towards the die 68 as shown by arrow a1, clinch-joining the site to temporarily join the upper frame 56 and the lower frame 57. Clinch-joining for temporarily joining the upper frame 56 and the lower frame 57 is referred to as TOX-Joining (registered trademark, Rix Corporation Co., Ltd.), and involves joining two panels in a die.

Figure 18:
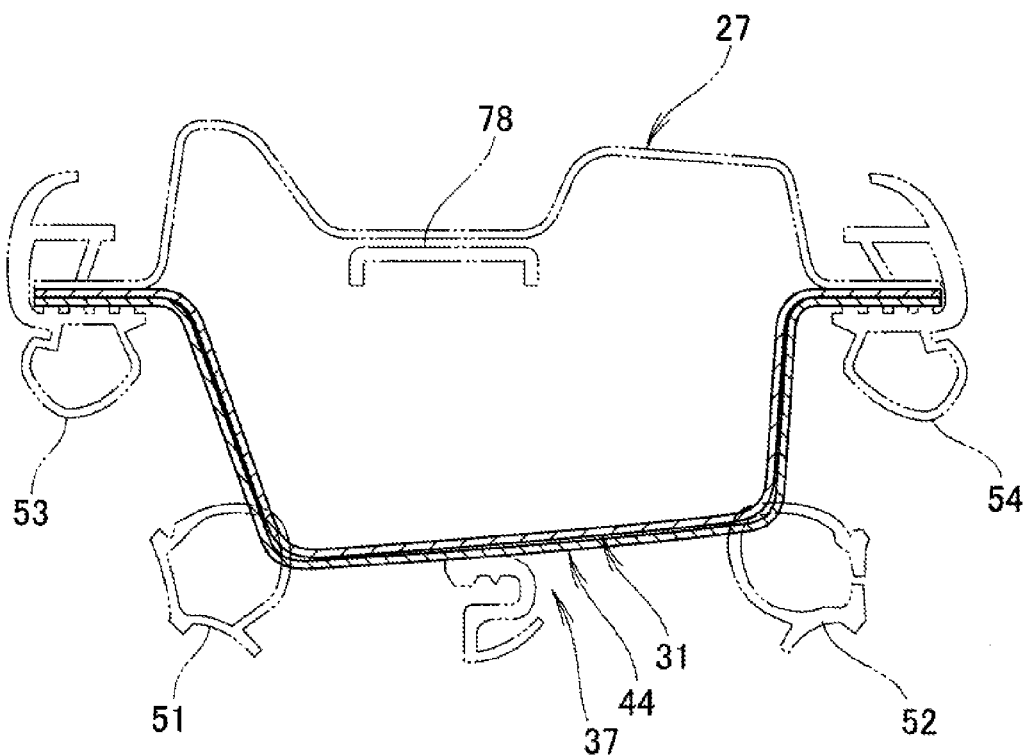
FIG. 18 is an enlarged sectional view taken along line 18-18 of FIG. 17.

ST02: As shown in FIG. 7, in the welding step, reinforcing members, such as a center pillar stiffener 78 (see FIG. 18), a side sill stiffener 79 (see FIG. 27), and the like are welded onto the upper frame 56 and the lower frame 57 constituting the side outer panel 21; and, as shown in FIG. 4, the upper end 72 of the center pillar outer 31 is welded to the upper frame 56, while the lower end 73 of the center pillar outer 31 is welded to the lower frame 57. Specifically, the center pillar outer 31, which has been hot-stamped, is spot welded between the roof side outer 37 and the side sill outer 41.

ST03: As shown in FIG. 7, in the painting step, in the joined sections of the upper frame 56 and the lower frame 57 (the front pillar joint 61 and the side sill joint 62 in FIG. 4) and the joined sections of the upper frame 56 and the center pillar outer 31 (the upper end joint 63 and the lower end joint 64 in FIG. 4), a hot melt in the form of a fixed-width tape (melt tape 74) or the like (see FIG. 13) is bonded as a filler over these joined sections, and the side outer panel 21, including the sections over which the melt tape 74 has been bonded, is painted. The method for bonding the melt tape 74 is discussed in detail below.

ST04: As shown in FIG. 7, in the assembly step, the side panel 21 is assembled together with the other components of the vehicle body.

Figure 13:
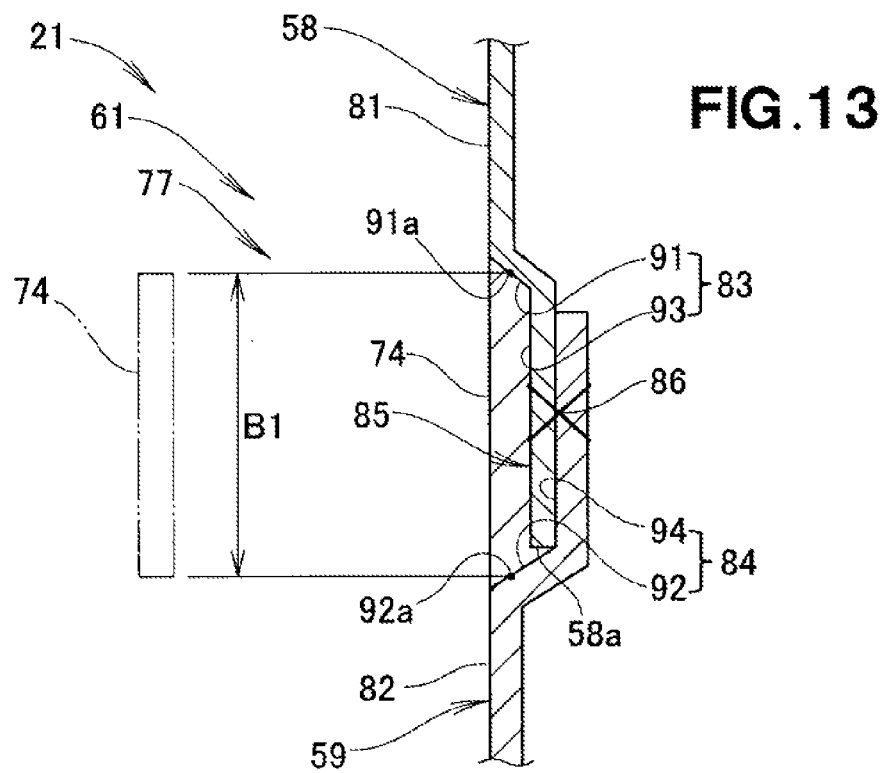
FIG. 13 is an enlarged sectional view taken along line 13-13 of FIG. 11.
Figure 14:
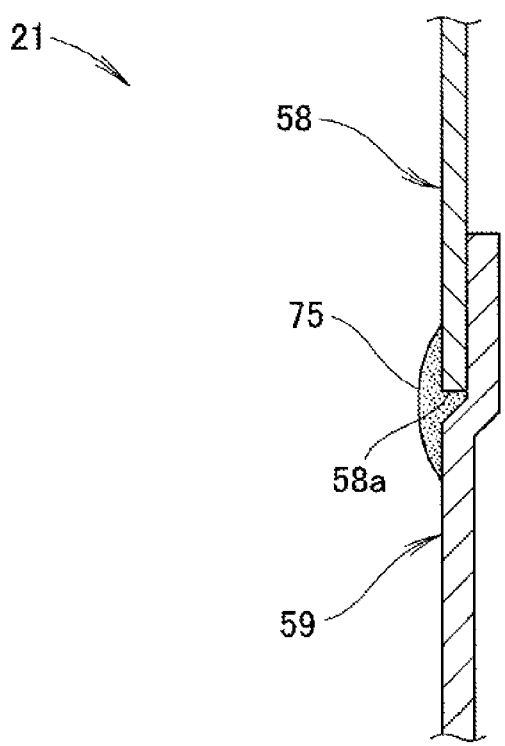
FIG. 14 is an enlarged sectional view taken along line 14-14 of FIG. 11.
Figure 15:
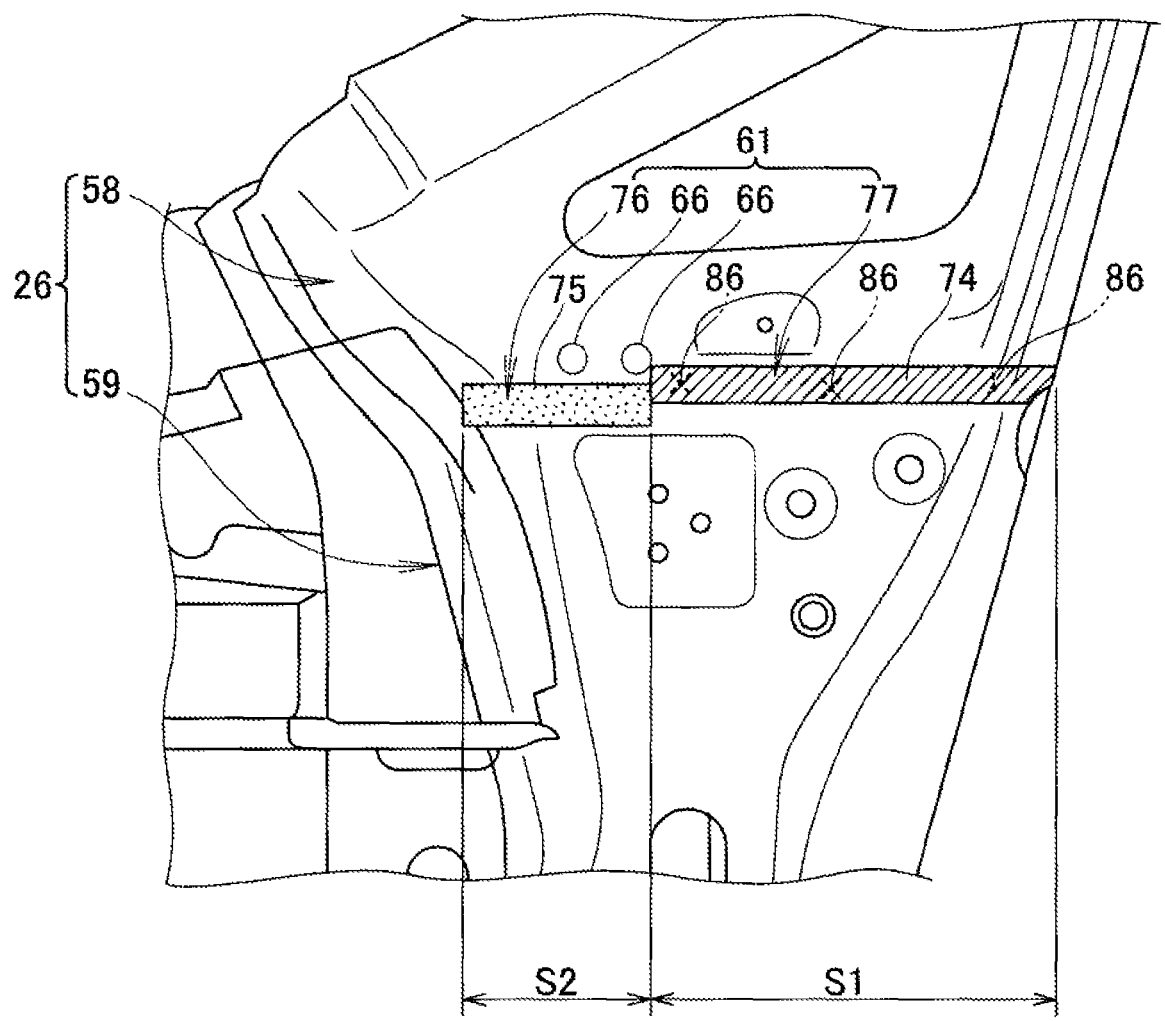
FIG. 15 is a side view of the front pillar joint of the side outer panel.
Figure 16:
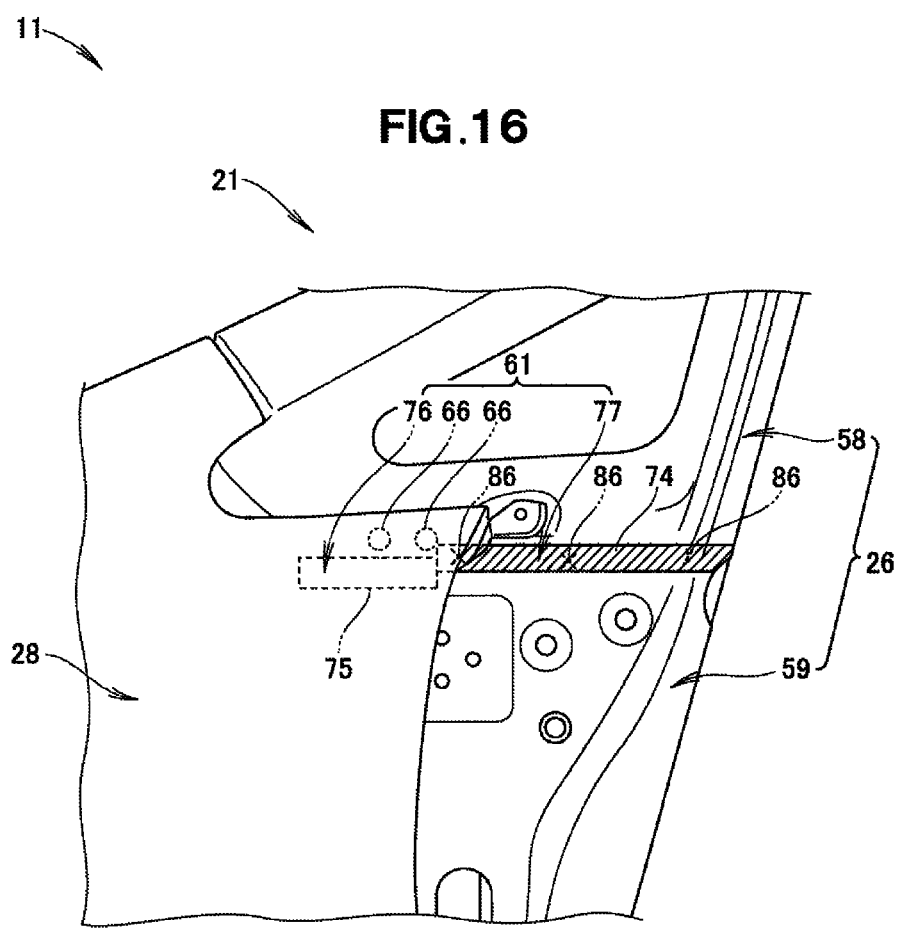
FIG. 16 is a side view of a front fender attached to the front pillar joint shown in FIG. 15.

FIGS. 11 to 16 show the front pillar joint 61 of the front pillar outer upper section (first outer panel) 58 of the upper frame 56 (FIG. 7) and the front pillar outer lower section (second outer panel) 59 of the lower frame 57 (FIG. 7). As shown in FIGS. 15 and 16, the front pillar joint 61 is constituted by the upper joints 66, 66, a front part joint 76, and a rear part joint 77. The front pillar outer lower section (second outer panel) 59 is arranged to extend behind the front pillar outer upper section (first outer panel) 58 to the passenger compartment 12 (FIG. 1) interior side thereof. A dust sealer (sealing agent) 75 is applied to the front part joint 76 of the front pillar joint 61 at the outside thereof in the lateral or vehicle width direction, protecting an end part (edge) 58a of the front pillar outer upper section (FIGS. 13, 14) from rainwater. The dust sealer (sealing agent) 75 is also a type of filler.

In the rear part joint 77 of the front pillar joint 61, there is formed a seam 85 (FIG. 13) in which the front pillar outer upper section (first outer panel) 58 and the front pillar outer lower section (second outer panel) 59 are depressed in a laterally inward direction, and spot welds 86 are made at three sites in this seam 85. As a filler, the hot melt in the form of a fixed-width tape (melt tape) 74 is bonded to the seam 85, protecting an end part 58a of the front pillar outer upper section (first outer panel) 58 from rainwater.

In greater detail, in the first outer panel 58 are formed a first general surface 81 constituting the panel surface, and a first flange section 83 formed by an end part of this first general surface 81 which is recessed one step down from the first general surface 81. The second outer panel 59 has a second general surface 82 constituting a panel surface situated at the same level as the first general surface 81 in a neighboring section when joined, and a second flange section 84 recessed one step down from the second general surface 82 and overlappingly joined to a rear surface of the first flange section 83.

Having the second flange section 84 joined to the first flange section 83 constitutes the seam 85 depressed below the first and second general surfaces 81, 82. The seam 85 is filled in with the filler (melt tape) 74 up to a surface height of the first and second general surfaces 81, 82, forming a smooth continuous surface from the first general surface 81 to the second general surface 82.

The first flange section 83 includes a first sloping surface 91 bent at an obtuse angle from the first general surface 81, and a first flat section 93 extending parallel to the first general surface 81 from the first sloping surface 91. The second flange section 84 includes a second sloping surface 92 bent at an obtuse angle from the second general surface 82, and a second flat section 94 extending parallel to the second general surface 82 from the second sloping surface 92.

As described previously, the filler 74 is a hot melt in the form of a fixed-width tape (melt tape). This hot melt in the form of a fixed-width tape has a width B1 from a medial section 91a of the first sloping surface 91 to a medial section 92a of the second sloping surface 92.

FIG. 15 shows an adhesion zone S1 of the hot melt in the form of a fixed-width tape (melt tape), and a dust sealer coating zone S2. In the adhesion zone S1, the melt tape 74 is bonded during the painting step shown in FIG. 5, and painted the same color as the side outer panel 21. In the dust sealer coating zone S2, the dust sealer 75 is coated on during the welding step shown in FIG. 5.

As shown in FIG. 16, the dust sealer coating zone S2 includes the upper clinch joints 66, 66, and is covered by the front fender 28 when the front fender (exterior component) 28 is attached, so as not to adversely affect the external appearance of the vehicle body 11. The seam 85 of the rear part joint 77 of the front pillar joint 61 (FIG. 13) is formed in a section exposed from the front fender 28 when the first and second outer panels 58, 59 are covered by the front fender 28.

Furthermore, that region of the front pillar joint 61 which is not concealed by the front fender 28 is formed in the seam 85 that is depressed relative to the general surfaces 81, 82 constituting the panel surface, the seam 85 being filled with the filler 74.

As shown in FIG. 12, in the front pillar joint 61, the front pillar outer upper section 58 and the front pillar outer lower section 59 are formed into a U-shaped cross section, bottom surfaces 58b, 59b of the U-shaped cross sections being clinch-joined to one another. As shown in FIG. 16, the region in which the front pillar joint 61 is covered by the front fender 28 is coated with the dust sealer 75.

FIGS. 17 to 21 show the upper end joint 63 where the upper end 72 of the center pillar outer 31 connects to the extension 44 of the roof side outer 37 of the upper frame 56 (FIG. 4). In the upper end joint 63, the roof side outer 37 corresponds to the first outer panel 58 (FIG. 13), and the center pillar outer 31 corresponds to the second outer panel 59 (FIG. 13).

Figure 17:
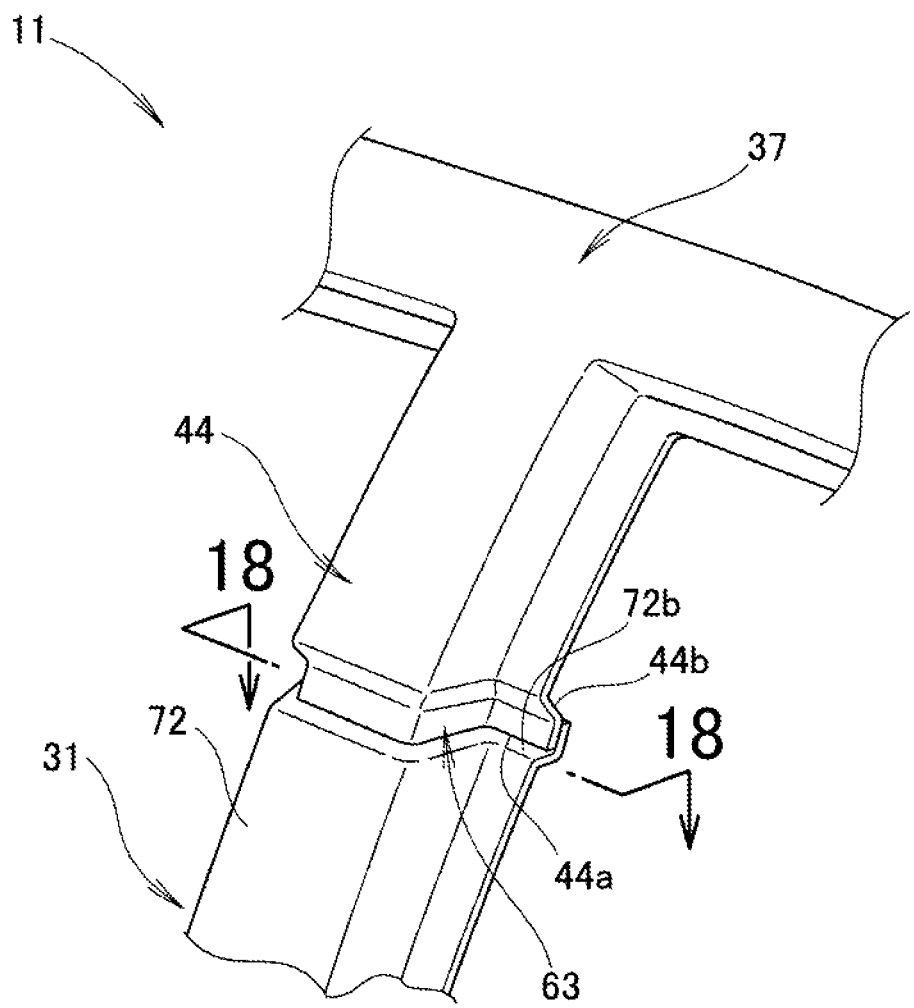
FIG. 17 is a perspective view of an upper section of a center pillar shown in FIG. 4.

As shown in FIG. 20, in the upper end joint 63, the upper end 72 of the center pillar outer 31 extends behind the extension 44 of the roof side outer 37, to the passenger compartment 12 (FIG. 1) interior side thereof. In the upper end joint 63, a seam (upper end seam) 105 depressed in a laterally inward direction of the vehicle is formed by the extension 44 of the roof side outer 37 and the upper end 72 of the center pillar outer 31. Spot welds 106 are made on this seam 105, and a hot melt (melt tape) 104 in the form of a fixed-width tape is bonded to the seam 105. As shown in FIG. 17, in the upper end joint 63, a step part (joggle) 44b is formed at the distal end of the extension 44, and a step part (joggle) 72b is formed at the upper end 72 of the center pillar outer 31.

Figure 19:
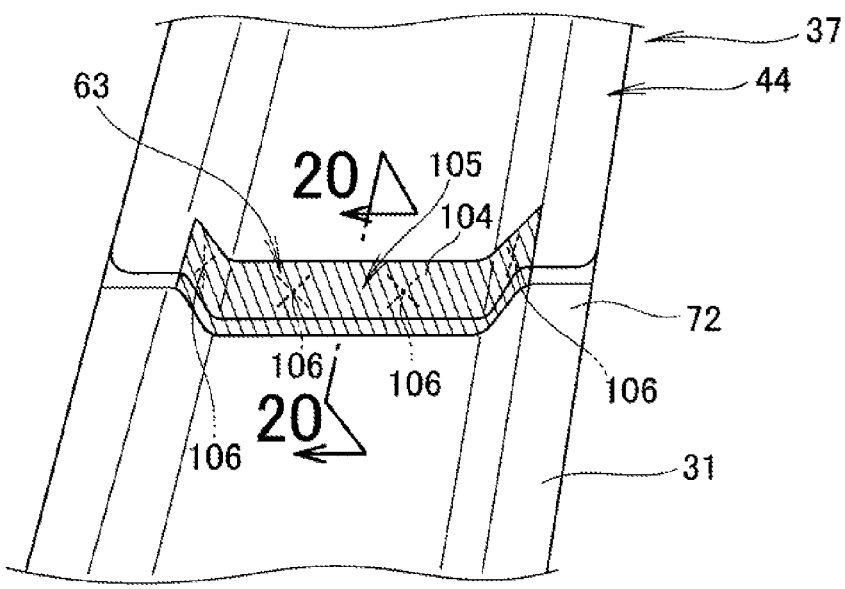
FIG. 19 is a perspective view of an upper end joint of the side outer panel shown in FIG. 4.

FIG. 20 shows a cross section of the upper end joint 63 shown in FIG. 19. The upper end joint 63 is approximately identical in shape to the rear part joint 77 of the front pillar joint 61 shown in FIG. 13.

Figure 21A:
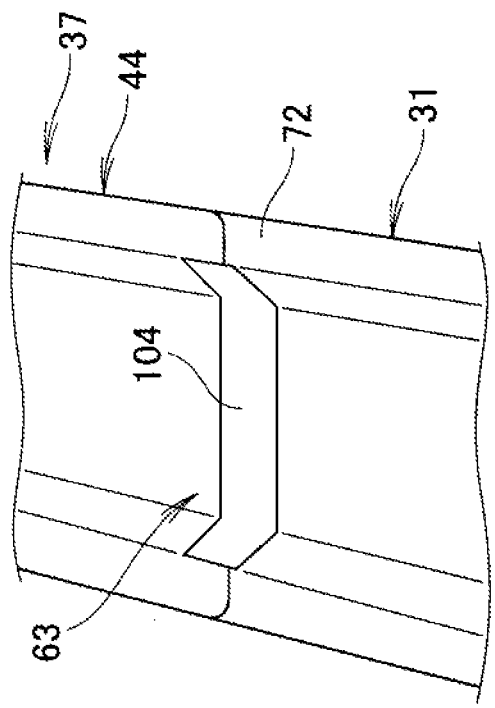
FIGS. 21(a) and 21(b) are views illustrative of an operation of the upper end joint shown in FIG. 19.
Figure 21B:
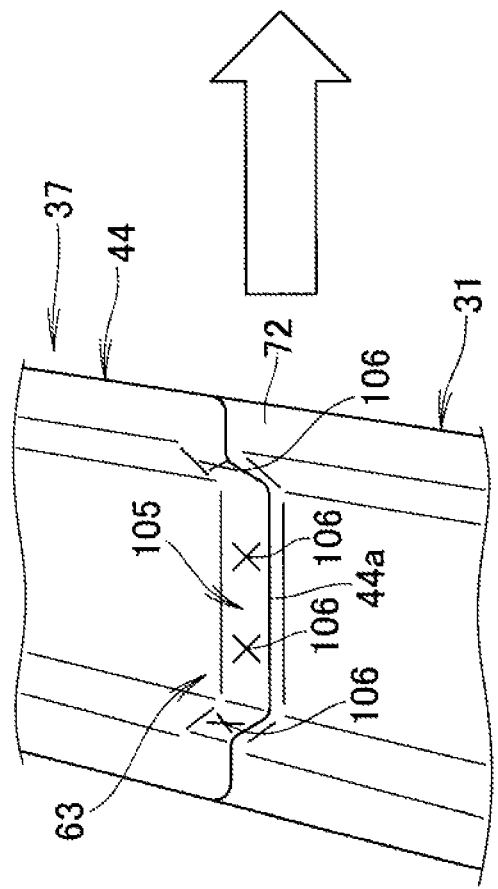

As shown in FIG. 21 (a), the upper end joint 63 has the seam (upper end seam) 105 formed by depression of the extension 44 of the roof side outer (first outer panel) 37 and of the upper end 72 of the center pillar outer 31 (second outer panel) towards a laterally inward direction of the vehicle. Because a plurality of spot welds 106 have been made in this seam 105, the welding marks of the spot welds 106 will be visible provided that no further processing is performed.

Accordingly, as shown in FIG. 21 (b), the hot melt (melt tape) 104 in the form of a fixed-width tape is bonded to the upper end seam 105, thereby forming a smooth surface from which the upper end seam of the extension 44 and the center pillar outer 31 is no longer visible. Then, in the painting step shown in FIG. 5, the melt tape is painted to the identical color, enhancing the design, and protecting an end part 44a of the extension 44 of the roof side outer 37 from rainwater (FIG. 21 (a)) so that the corrosion resistance is improved.

Figure 22:
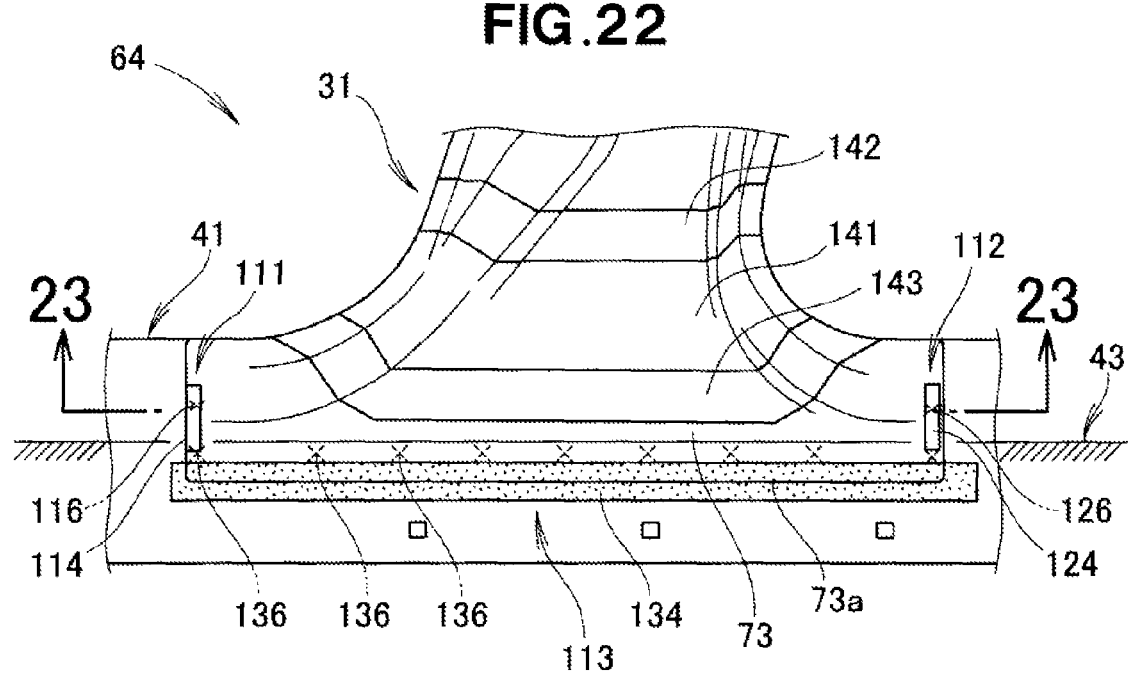
FIG. 22 is a side view of a lower end joint of the side outer panel shown in FIG. 4.
Figure 23:
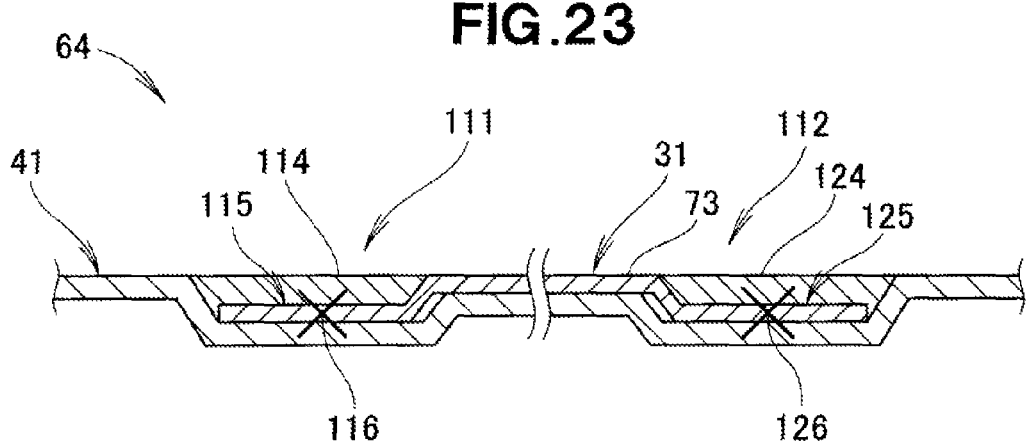
FIG. 23 is a sectional view taken along line 23-23 of FIG. 22.

FIGS. 22 and 23 show the lower end joint 64 where the lower end 73 of the center pillar outer 31 is connected to the side sill outer 41 of the lower frame 57 shown in FIG. 4. In the lower end joint 64, in terms of the relationship of the lower end 73 of the center pillar outer 31 and the side sill outer 41, the center pillar outer 31 corresponds to the first outer panel 58 (FIG. 13), and the side sill outer 41 corresponds to the second outer panel 59 (FIG. 13).

The lower end joint 64 is constituted by a front joint part 111, a rear joint part 112, and a lower joint part 113. In the lower end joint 64, the side sill outer 41 extends behind the lower end 73 of the center pillar outer 31, to the passenger compartment 12 (FIG. 1) interior side thereof.

In the front joint part 111 there is formed a seam (front lower end seam) 115 in which the lower end 73 of the center pillar outer 31 and the side sill outer 41 are depressed inwardly in the lateral or vehicle width direction. A spot weld 116 is made at a single location in this seam 115, and a hot melt (melt tape) 114 in the form of a fixed-width tape is bonded to the seam 115.

In the rear joint part 112, there is formed a seam (rear lower end seam) 125 in which the lower end 73 of the center pillar outer 31 and the side sill outer 41 are depressed inwardly in the lateral or vehicle width direction. A spot weld 126 is made at a single location in this seam 125, and a hot melt (melt tape) 124 in the form of a fixed-width tape is bonded to the seam 125. Specifically, the seams 105, 115, 125 of the upper end joint 63, the front joint part 111, and the rear joint part 112 are employed in the center pillar outer 31.

In the lower joint part 113, spot welds 136 are made at a plurality of locations, and an end part (edge) 73*a* of the lower end 73 of the center pillar outer 31 is coated with a dust sealer (sealing agent) 134. The welding marks of these spot welds 136 and the dust sealer 134 are covered by the side sill garnish 43. The dust sealer (sealing agent) 134 is also one type of filler.

In the vicinity of the lower end 73 of the center pillar outer 31 are disposed a lower-rigidity first weak part 141 to enable absorption of the energy of side impact, and second and third weak parts 142, 143 situated above and below this first weak part 141, and having greater rigidity than the first weak part 141.

As shown in FIG. 23, the joint parts 111, 112 at the front and rear of the lower end joint 64 are approximately identical in shape to the rear part joint 77 of the front pillar joint 61 shown in FIG. 13.

FIGS. 24 to 28 show the side sill joint 62 where the rear pillar outer 34 of the upper frame 56 and the side sill outer 41 of the lower frame 57 are connected. In the side sill joint 62, the rear pillar outer 34 corresponds to the first outer panel 58 (FIG. 13), and the side sill outer 41 corresponds to the second outer panel 59 (FIG. 13).

In the side sill joint 62, the rear end of the side sill outer 41 extends behind the rear pillar outer 34, to the passenger compartment 12 (FIG. 1) interior side thereof. The side sill joint 62 is constituted by the lower clinch joints 67, 67, a side sill front joint part 151, a side sill upper joint part 152, and a side sill lower joint part 153.

In the side sill front joint 151, there is formed a seam (side sill seam) 155 in which the rear pillar outer 34 and the side sill outer 41 are depressed inwardly in the lateral or vehicle width direction. A spot weld 156 is made at a single location in this seam 155, and a hot melt (melt tape) 154 in the form of a fixed-width tape is bonded to the seam 155, and protects a front end part 34*a* of the rear pillar outer 34 from rainwater. The hot melt (melt tape) 154 in the form of a fixed-width tape is the filler for filling the seam (side sill seam) 155.

Spot welds 157, 157 are made at two locations in the side sill upper joint part 152. A spot weld 158 is made at a single location in the side sill lower joint part 153, and spot welds 159 are made at six locations in a side sill extension 161 that extends out towards the rear of the vehicle body from the side sill outer 41.

The single spot weld 158 of the side sill lower joint part 153, the six spot welds 159, and the temporarily joined lower clinch joints 67, 67 are coated with a dust sealer (sealing agent) 164 which protects them and a lower end part 34*b* of the rear pillar outer 34 from rainwater. The dust sealer (sealing agent) 164 is also one type of filler.

Figure 27:
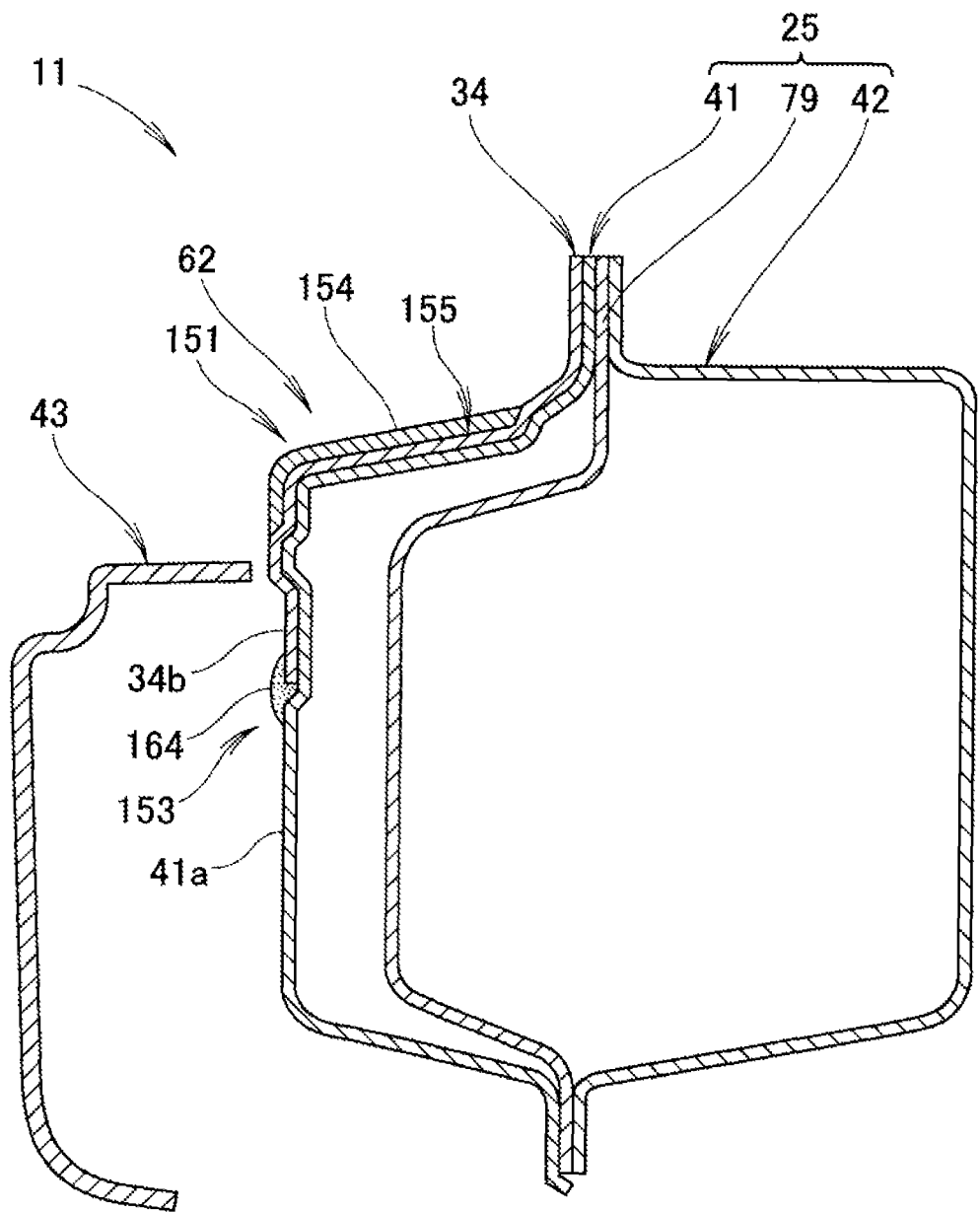
FIG. 27 is an enlarged sectional view taken along line 27-27 of FIG. 26.
Figure 28:
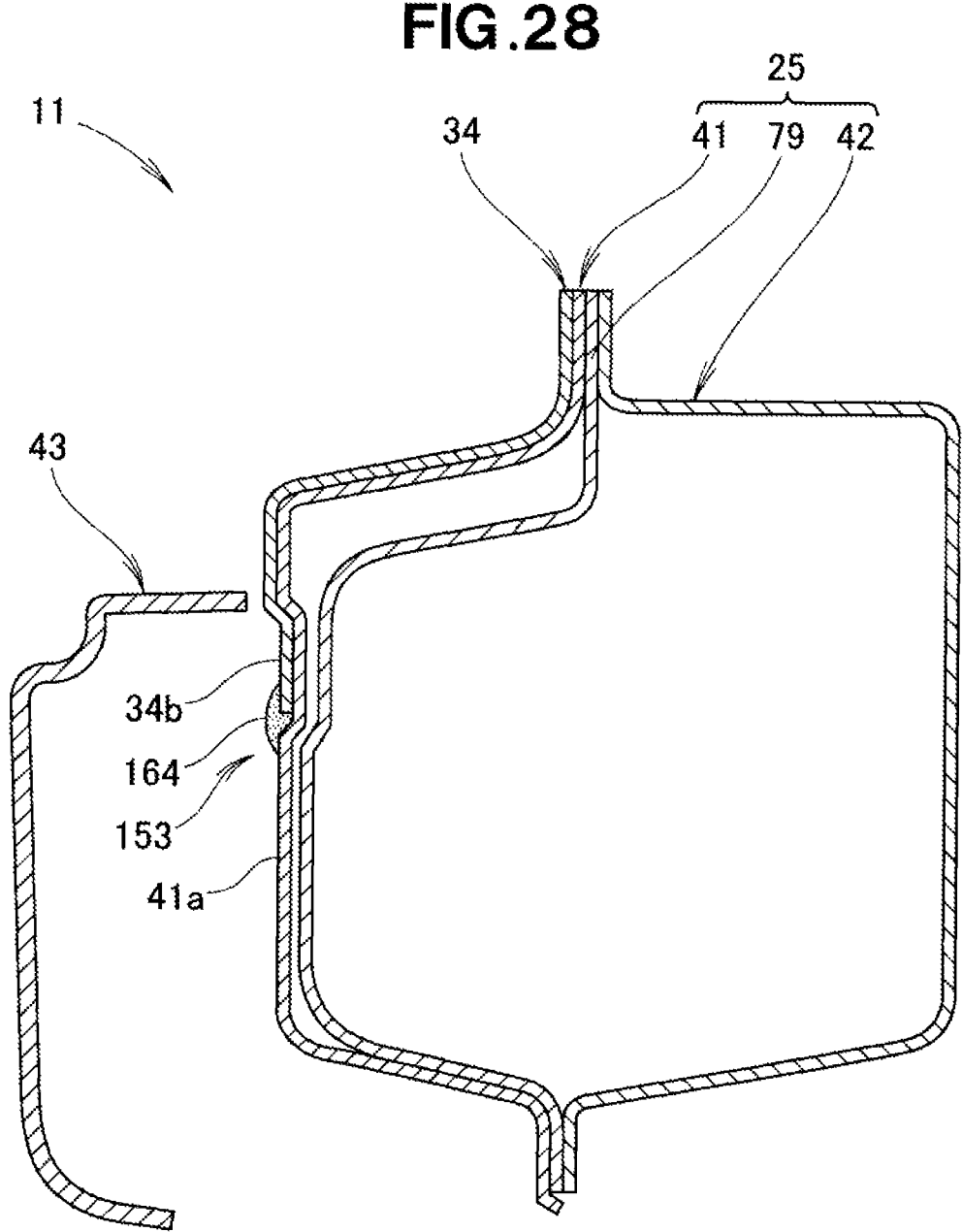
FIG. 28 is an enlarged sectional view taken along line 28-28 of FIG. 26.

As shown in FIGS. 27 and 28, the outside surface of the lower end part 34*b* of the rear pillar outer 34 is formed coplanar with the outside surface 41*a* of the side sill outer 41 in the lateral direction. The side sill lower joint part 153 is covered by the side sill garnish 43. The side sill front joint part 151 constitutes a decorative surface exposed to the outside.

The seam (side sill seam) 155 of the side sill front joint part 151 is formed in a section that is exposed from the side sill garnish 43 (exterior component) when the side sill garnish 43 (exterior component) covers the first and second outer panels 58, 59 (FIG. 4). Further, a region of the side sill joint (joint) 62 not concealed by the side sill garnish 43 (exterior component), when formed in the seam 155 depressed relative to the general surfaces constituting the panel surface, gets covered up by the filler (melt tape) 154 which fills in the seam 155.

The region of the side sill joint (joint) 62 covered by the side sill garnish (exterior component) 43 is coated with the dust sealer 164.

Figure 29:
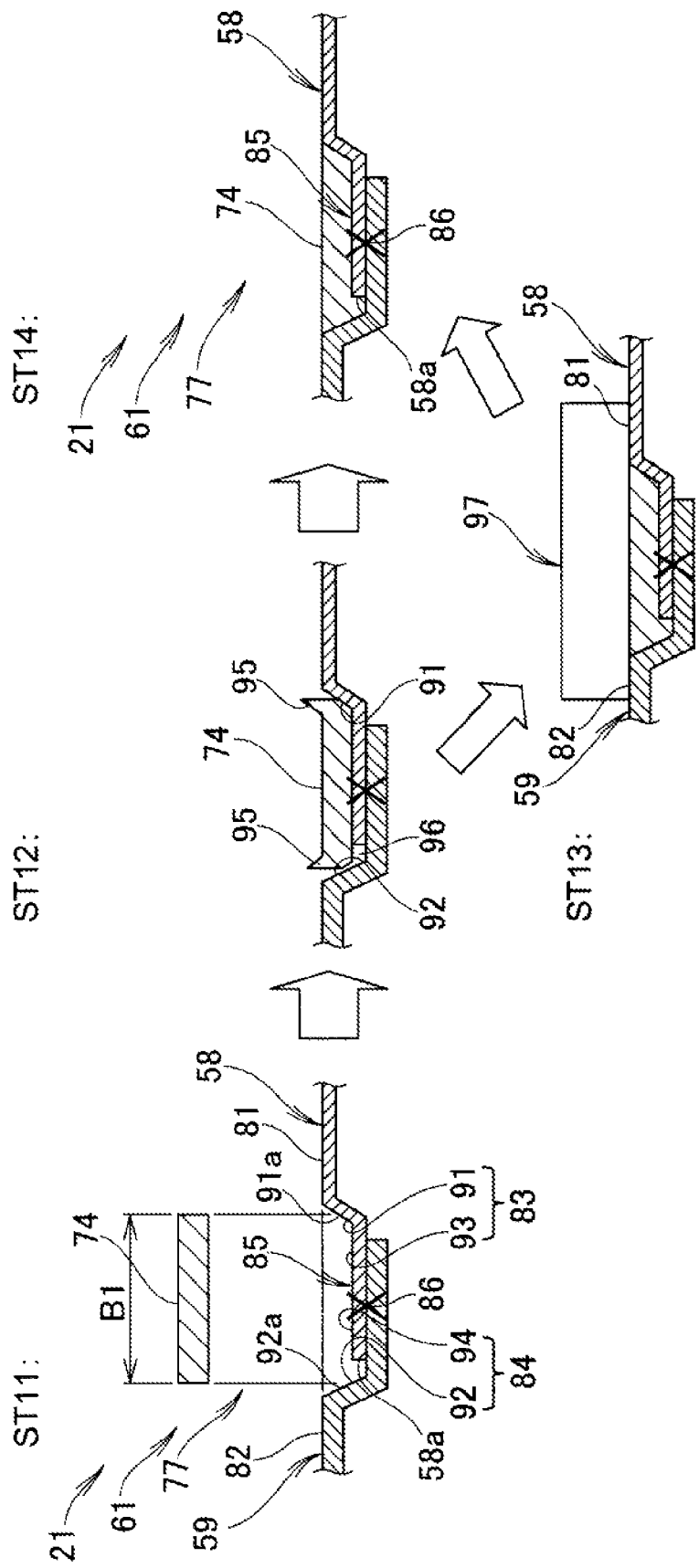
FIG. 29 is a diagrammatical view showing a method of manufacturing the front pillar joint shown in FIG. 4.

The method for manufacturing the side outer panel (outer panel of the vehicle) 21 shall now be described with reference to FIG. 29. More specifically, a method for manufacturing the front pillar joint 61 shall be described by way of an example of a method for manufacturing the side outer panel 21 shown in FIG. 4.

In this method for manufacturing the side outer panel 21 (outer panel of the vehicle), the front pillar outer lower section (second outer panel) 59 is joined to the front pillar outer upper section (first outer panel) 58.

In ST11, the first outer panel 58 has the first general surface 81 constituting the panel surface, and the first flange section 83 formed by an end part of this first general surface 8 that is depressed further back in relation to this first general surface 81. The second outer panel 59 has the second general surface 82 constituting a panel surface situated at same level as the first general surface 81 in a neighboring section when joined, and the second flange section 84 depressed relative to this second general surface 82 and overlappingly joined to the rear surface of the first flange section 83.

The first general surface 81 and the second general surface 82 are formed in a coplanar (flat) profile. The spot welds 86 are made on the first flange section 83 and the second flange section 84; therefore, welding marks of the spot welds 86 remain on the first flange section 83 at the outward side in the lateral direction.

The seam 85 depressed relative to the first and second general surfaces 81, 82 is formed by joining of the second flange section 84 to the first flange section 83. The seam 85 is filled with the filler 74 up to the surface height of the first and second general surfaces 81, 82, forming a continuous surface at the first general surface 81 and the second general surface 82.

Furthermore, the first flange section 83 has the first sloping surface 91 bent at an obtuse angle from the first general surface 81, and the first flat section 93 extending parallel to the first general surface 81 from this first sloping surface 91. The second flange section 84 has the second sloping surface 92 bent at an obtuse angle from the second general surface 82, and the second flat section 94 extending parallel to the second general surface 82 from this second sloping surface 92.

The filler 74 is a hot melt in the form of a fixed-width tape (melt tape). The hot melt in the form of a fixed-width tape used herein has a width B1 from the medial section 91*a* of the first sloping surface 91 to the medial section 92*a* of the second sloping surface 92.

In ST12, once the hot melt in the form of a fixed-width tape (melt tape) 74 has been bonded over the seam 85, protruding parts 95, 95 protruding beyond the first and second sloping surfaces 91, 92 from the surface of the melt tape 74 are formed in sections abutting the first and second sloping surfaces 91, 92.

In ST14, when the side outer panel 21 passes through the drying oven during the painting step shown in FIG. 5, the melt tape 74 melts, whereupon the protruding parts 95, 95 shown in ST12 fill up the gaps 96 and cover the end part of the first flange section 83, with the melt tape 74 yielding a smooth (flat) continuous surface (surface of continuity) from the first general surface 81 to the second general surface 82. The end part of the first flange section 83 corresponds to the end part (edge) 58a of the front pillar outer upper section 58.

ST 13 is a jig pressing step employing a jig 97.

As shown in FIGS. 13 and 14, the side outer panel 21 (outer panel of the vehicle) has a joint (the front pillar joint) 61 joining the first outer panel 58 and the second outer panel 59, the joint 61 being filled with the filler (melt tape or dust sealer) 74, 75. The first outer panel 58 has the first general surface 81 constituting the panel surface, and the first flange section 83 formed by an end part of this first general surface 8 that is depressed further back in relation to this first general surface 81. The second outer panel 59 has the second general surface 82 constituting a panel surface situated at the same level as the first general surface 81 in a neighboring section when joined, and the second flange section 84 depressed relative to this second general surface 82 and overlappingly joined to the rear surface of the first flange section 83.

The seam 85 depressed relative to the first and second general surfaces 81, 82 is formed by joining of the second flange section 84 to the first flange section 83. The seam 85 is filled with the filler 74 up to the surface height of the first and second general surfaces 81, 82, forming the first general surface 81 and the second general surface 82 into a continuous surface, making the seam 85 depressed relative to the first and second general surfaces 81, 82 resistant to corrosion, and allowing a smooth surface from which the seam 85 is not visible to be formed. As a result, the corrosion resistance in the seam 85 of the panels can be improved, as can the design of the side outer panel 21. For example, because the filler 74 can be painted the same color as the panel, the design can be enhanced further. The seam (upper end seam) 105 (FIG. 20), the seam (front lower end seam) 115 (FIG. 23), the seam (rear lower end seam) 125, and the seam (side sill seam) 155 (FIG. 25) are substantially identical in structure to the seam 85.

Because the filler for the side outer panel (outer panel of the vehicle) 21 is a dust sealer (sealing agent) 75 as shown in FIG. 14, the dust sealer can be coated on using a coating gun held by a robot, and the coating operation can be automated. The lower end joint 63 (FIG. 22) and the side sill joint 62 (FIG. 24) are substantially identical in structure.

Because the filler 74 in the side outer panel (outer panel of the vehicle) 21 is a hot melt in the form of a fixed-width tape (melt tape) 74 as shown in FIG. 13, sealing of the side outer panel 21 can be facilitated. The seam (upper end seam) 105 (FIG. 20), the seam (front lower end seam) 115 (FIG. 23), the seam (rear lower end seam) 125, and the seam (side sill seam) 155 (FIG. 25) are substantially identical in structure to the seam 85.

As shown in FIG. 13, the first flange section 83 of the side outer panel (outer panel of the vehicle) 21 has the first sloping surface 91 bent at an obtuse angle from the first general surface 81, and the first flat section 93 extending parallel to the first general surface 81 from this first sloping surface 91. The second flange section 84 has the second sloping surface 92 bent at an obtuse angle from the second general surface 82, and the second flat section 94 extending parallel to the second general surface 82 from this second sloping surface 92.

The hot melt in the form of a fixed-width tape has a width B1 from the medial section 91a of the first sloping surface 91 to the medial section 92a of the second sloping surface 92, and accordingly can be made to flow into upper sections of the sloped surfaces and smooth out; e.g., by being melted. As a result, sealing of the side outer panel 21 can be facilitated. The seam (upper end seam) 105 (FIG. 20), the seam (front lower end seam) 115 (FIG. 23), the seam (rear lower end seam) 125, and the seam (side sill seam) 155 (FIG. 25) are substantially identical in structure to the seam 85.

Figure 25:
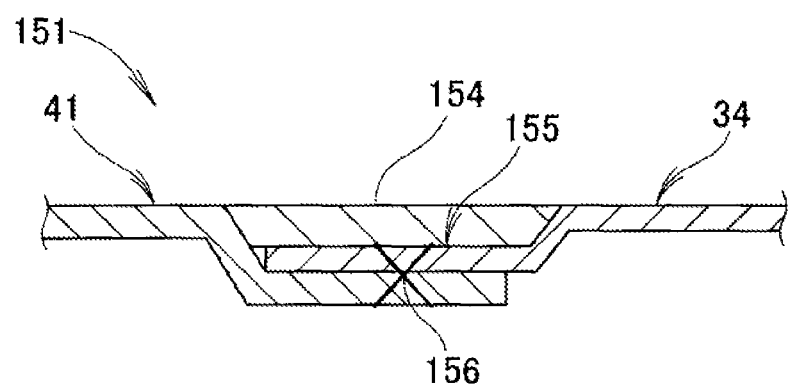
FIG. 25 is an enlarged sectional view taken along line 25-25 in FIG. 24.

As shown in FIGS. 20, 23, and 25, in the side outer panel (outer panel of the vehicle) 21 (FIG. 13), the seam (upper end seam) 105 (FIG. 20), the seam (front lower end seam) 115 (FIG. 23), the seam (rear lower end seam) 125, and the seam (side sill seam) 155 (FIG. 25) are furnished to the center pillar outer 31. For example, in a case in which the center pillar outer 31 is joined to the roof side outer 37 constituting an outer panel and to the side sill outer 41 constituting an outer panel, it is desirable to reliably inhibit corrosion in the seams 105, 115, 125 thereof, as well as to make the seams 105, 115, 125 less conspicuous. By incorporating the seams 105, 115, 125 into the center pillar outer 31, the quality of the side outer panel 21 of the vehicle can be improved, as can the design. Moreover, smoothing the seams 105, 115, 125 allows the door seals 51, 52 (FIG. 1) to have better sealing performance.

Figure 24:
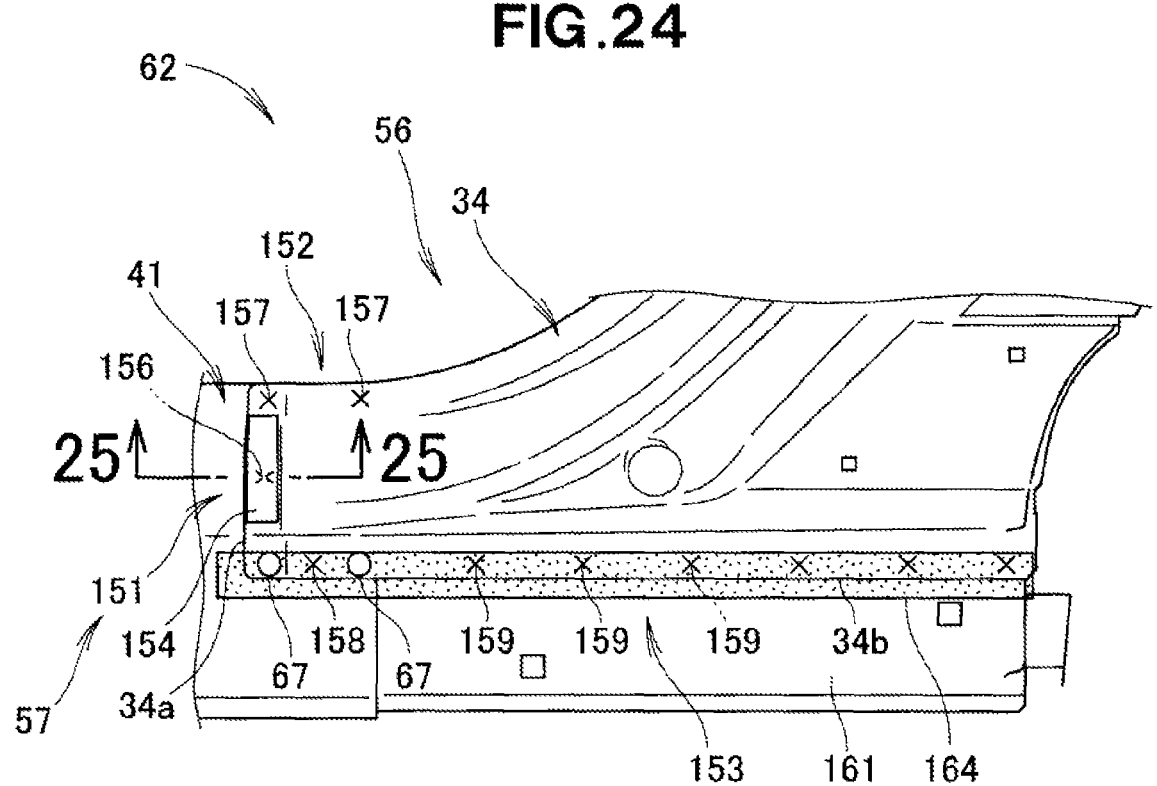
FIG. 24 is a side view of a side sill joint shown in FIG. 4.
Figure 26:
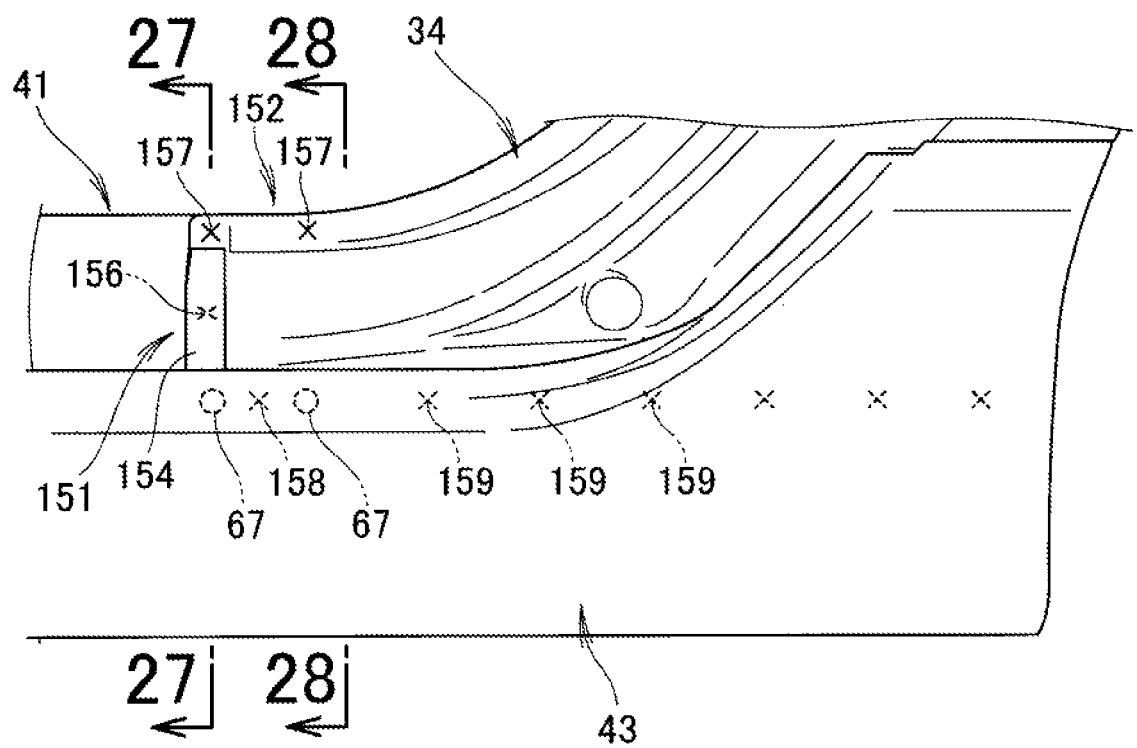
FIG. 26 is a side view of a side sill garnish attached to the side sill shown in FIG. 4.

As shown in FIG. 13, the seam 85 is formed in a section exposed from the exterior component 28 when the front fender (exterior component) 28 (FIG. 16) is present covering the first and second outer panels 58, 59 of the side outer panel (outer panel of the vehicle) 21; therefore, the coverage area smoothed by the filler 74 can be minimized. The side outer panel 21 can thereby be fabricated more easily, which can reduce the cost of the side outer panel 21. As shown in FIGS. 24 to 26, a comparable relationship exists between the seam (side sill seam) 155 and the side sill garnish (exterior component) 43 as well.

As shown in FIG. 16, in the side outer panel (outer panel of the vehicle) 21, the part of the joint (front pillar joint) 61 covered by the front fender (exterior component) 28 when the exterior component 28 covering the first and second outer panels 58, 59 is present is coated with the dust sealer 75; therefore, the coverage area smoothed by the filler 74 can be minimized. This allows the cost of the side outer panel 21 to be reduced. As shown in FIGS. 24 to 26, a comparable relationship exists between the lower end joint 64 (FIG. 22) or the side sill joint 62 (FIG. 24) and the side sill garnish (exterior component) 43 as well.

Figure 11:
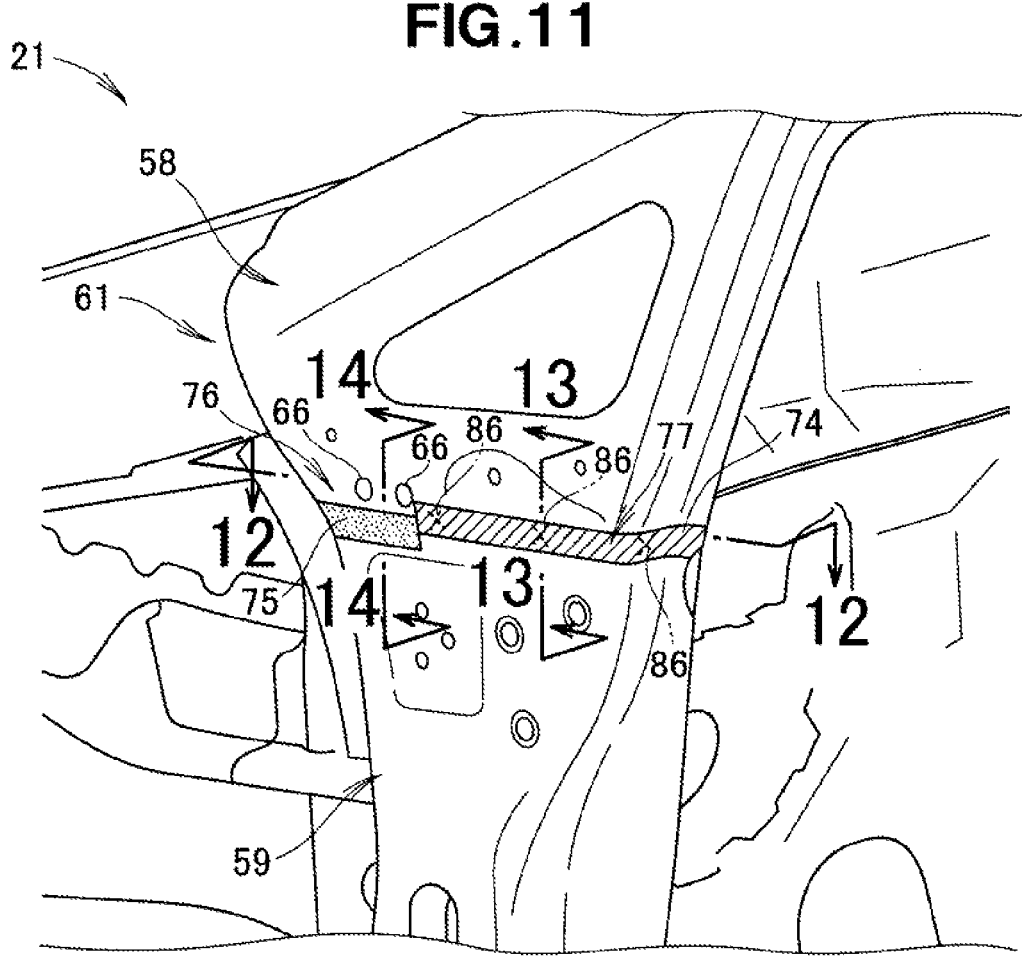
FIG. 11 is a perspective view of a front pillar joint of the side outer panel shown in FIG. 4.

As shown in FIG. 11, in the outer panel for a vehicle according to the present invention, the front pillar joint 61 is constituted by the front part joint 76 coated by the dust sealer 75, and the rear part joint 77 in which the hot melt in the form of a fixed-width tape (melt tape) 74 has been bonded to the seam 85 as the filler 74. However, such an arrangement is not provided by way of limitation, and is not intended to preclude providing the entirety of the front pillar joint with a seam having the shape of the seam 85, and bonding melt tape thereto.

As shown in FIGS. 1 to 4, 16, and 26, the frame-shaped side outer panel 21 of the vehicle in which the door openings 45, 46 are formed is separated into the upper frame 56 integrally formed of an ordinary steel plate and including the front pillar outer upper section 58, the roof side outer 37, the rear pillar outer 34, and the rear fender 36; and the lower frame 57 integrally formed of a steel plate of higher tensile strength than the upper frame 56, and including the front pillar outer lower section 59 and the side sill outer 41.

In the front pillar joint (joint) 61 between the front pillar outer upper section 58 and the front pillar outer lower section 59, a region covered by the exterior component, namely, the front fender 28, is clinch-joined, while in the side sill joint (joint) 62 between the side sill outer 41 and the rear pillar outer 34, a region covered by the exterior component, namely, the side sill garnish 43 (FIG. 27), is clinch-joined.

Since the upper frame 56 and the lower frame 57 are provisionally held by clinch-joining, the upper frame 56 and the lower frame 57 can be transported from the pressing step to the welding step as a single unit, which can allow the side outer panel 21 to be produced more efficiently. For example, clinch joints having relatively large indentations can be concealed by the exterior components 28, 43. The design of the side outer panel 21 is thereby improved.

As shown in FIGS. 1 to 4 and 13, in the side panel 21, a region in the joint 61 not concealed by the exterior component (front fender) 28 forms the seam 85 depressed relative to the general surfaces 81, 82 constituting the panel surface, and the seam 85 is filled with the filler 74. Therefore, joint strength can be ensured, e.g., by spot-welding of the seam 85, and filling in the seam 85 the filler 74 can enhance the design. As shown in FIG. 27, a comparable relationship exists between the side sill joint (joint) 62 and the side sill garnish (exterior component) 43.

As shown in FIGS. 11 and 12, in the side outer panel 21, the front pillar outer upper section 58 and the front pillar outer lower section 59 are formed into a U-shaped cross section, and the bottom surfaces 58b, 59b of U-shaped cross section are clinch-joined together. Since stress is readily dispersed in the bottom surfaces 58b, 59b, the provisional hold afforded by the clinch joint is stable. It is accordingly possible to achieve a provisional hold with few clinch joints (join sites).

As shown in FIG. 4, the hot-stamped center pillar outer 31 is spot-welded in the side outer panel 21 between the roof side outer 37 and the side sill outer 41; therefore, the side outer panel 21 can be further strengthened.

As shown in FIG. 16, in the side outer panel 21, a region of the side sill joint (joint) 61 covered by the front fender (exterior component) 28 is coated with the dust sealer 75. Therefore, for example, the coverage area smoothed by the filler 74 which fills the seam 85 (FIG. 13) can be minimized. This allows fabrication of the side outer panel 21 to be facilitated, which, in turn, allows the cost of the side outer panel 21 to be reduced. As shown in FIG. 27, a comparable relationship exists between the side sill joint (joint) 62 and the side sill garnish (exterior component) 43.

As shown in FIG. 11, in the side outer panel for a vehicle according to the present invention, the front pillar joint 61 is constituted by the front part joint 76 coated by the dust sealer 75, and the rear part joint 77 in which the hot melt in the form of a fixed-width tape (melt tape) 74 has been bonded to the seam 85 (FIG. 13) as the filler 74. However, such an arrangement is not provided by way of limitation; it would be acceptable to provide the entirety of the front pillar joint with a seam having the shape of the seam 85, and to bond melt tape thereto.

INDUSTRIAL APPLICABILITY

The side outer panel for a vehicle according to the present invention is suitably incorporated into a passenger vehicle, such as a sedan or station wagon.

REFERENCE SIGNS LIST

21: Side outer panel (outer panel for vehicle)
26: Front pillar outer
28: Exterior component (front fender)
31: Center pillar outer
34: Rear pillar outer
36: Rear fender
37: Roof side outer
41: Side sill outer
43: Exterior component (side sill garnish)
45, 46: Front, rear door openings
56: Upper frame
57: Lower frame
58: First outer panel (front pillar outer upper section)
59: Second outer panel (front pillar outer lower section)
59a: Bottom surface of U-shaped cross section
61: Joint (front pillar joint)
62: Joint (side sill joint)
66: Upper clinch joint
67: Lower clinch joint
74: Filler (melt tape)
75: Filler (dust sealer)
81: First general surface constituting panel surface
82: Second general surface constituting panel surface
83: First flange section
84: Second flange section
85: Seam
91: First sloping surface
91a Medial section of first sloping surface
92 Second sloping surface
92a: Medial section of second sloping surface
93: First flat section
94: Second flat section

The invention claimed is:

1. A frame-shaped side outer panel for a vehicle, comprising:
   an upper frame and a lower frame manufactured separately from one another;
   the upper frame being integrally formed of a steel plate and including a front pillar outer upper section, a roof side outer, a rear pillar outer, and a rear fender;
   the lower frame being integrally formed of a steel plate of higher tensile strength than the upper frame and including a front pillar outer lower section and a side sill outer;
   the front pillar outer upper section and the front pillar outer lower section being joined together and forming a front pillar joint, the front pillar joint including a first region covered by a front fender as a first exterior component; and
   the side sill outer and the rear pillar outer being joined together and forming a side sill joint, the side sill joint including a first region covered by a side sill garnish as a second exterior component,
   wherein the front pillar joint also includes a second region not concealed by the first exterior component and formed into a first seam, wherein the front pillar outer upper section and the front pillar outer lower section in the first seam are depressed relative to general surfaces of the panel and spot-weld-connected to one another, and
   wherein the side sill joint also includes a second region not concealed by the second exterior component and formed into a second seam, wherein the side sill outer and the rear pillar outer in the second seam are depressed relative to the general surfaces of the panel and spot-weld-connected to one another.

2. The side outer panel for a vehicle, according to claim 1, wherein the front pillar outer upper section and the front pillar outer lower section are formed into a U-shaped cross section, with bottom surfaces of the U-shaped cross section being clinch-joined to one another.

3. The side outer panel for a vehicle, according to claim 1, wherein a hot-stamped center pillar outer is spot-welded between the roof side outer and the side sill outer.

4. The side outer panel for a vehicle, according to claim 3, wherein the center pillar outer has an upper end and a lower end, the upper end of the center pillar outer and the roof side outer being joined together and forming an upper end joint, the lower end of the center pillar outer and the side sill outer being joined together and forming a lower end joint, the upper end joint being formed into a third seam, the center pillar outer and the roof side outer in the third seam being depressed relative to the general surfaces of the panel and spot-weld-connected to one another, the lower end joint including a first region covered by the second exterior component and a second region not concealed by the second exterior component, the second region of the lower end joint being formed into a fourth seam, and the center pillar outer and the side sill outer in the fourth seam being depressed relative to the general surfaces of the panel and spot-weld-connected to one another.

5. The side outer panel for a vehicle, according to claim 1, wherein each of the depressed first and second seams is provided with a filler.

6. The side outer panel for a vehicle, according to claim 5, wherein each of the depressed first and second seams is filled with the filler up to a surface height of the general surfaces so that the general surfaces and an outer surface of the filler are formed into a substantially continuous surface.

7. The side outer panel for a vehicle, according to claim 5, wherein the filler is a hot melt in the form of a fixed-width tape.

8. The side outer panel for a vehicle, according to claim 5, wherein the filler is a dust sealer.

9. The side outer panel for a vehicle, according to claim 1, wherein the front pillar joint is coated with a dust sealer in the first region thereof covered by the first exterior component, and wherein the side sill joint is coated with a dust sealer in the first region thereof covered by the second exterior component.

* * * * *